US 6,570,536 B2

(12) United States Patent
Smith

(10) Patent No.: US 6,570,536 B2
(45) Date of Patent: May 27, 2003

(54) COMMUNICATIONS SYSTEM

(75) Inventor: Stephen H. Smith, Leucadia, CA (US)

(73) Assignee: Smith Technology Development, LLC., San Diego, CA (US)

( * ) Notice: Subject to any disclaimer, the term of this patent is extended or adjusted under 35 U.S.C. 154(b) by 0 days.

(21) Appl. No.: 09/899,821

(22) Filed: Jul. 9, 2001

(65) Prior Publication Data

US 2002/0057218 A1 May 16, 2002

Related U.S. Application Data

(63) Continuation of application No. 09/064,525, filed on Apr. 23, 1998, now Pat. No. 6,271,790, which is a continuation-in-part of application No. 08/853,833, filed on May 9, 1997, now Pat. No. 6,204,810.

(51) Int. Cl.[7] .......................... H01Q 21/06; H01Q 21/24
(52) U.S. Cl. ........................... 342/365; 342/363
(58) Field of Search ................. 342/363, 364, 342/365, 366

(56) References Cited

U.S. PATENT DOCUMENTS 5,842,135 A  * 11/1998 Ishijima ...................... 455/504

* cited by examiner

Primary Examiner—Theodore M. Blum
(74) Attorney, Agent, or Firm—Kenyon & Kenyon

(57) ABSTRACT

A communications system in which a communications channel is defined at least in part by an electromagnetic wave having a carrier frequency and an electric field vector, the extremity or terminus of which traces a non-linear periodic path at a rotation frequency less than the carrier frequency and greater than zero from the perspective of an observer looking into the axis of propagation of the wave. The transmitter of the communications system launches a wave having such characteristics and modulated with information in a suitable manner. The receiver of the communications system is sensitive to the periodic path and rotation frequency. The combination of the periodic path and the carrier frequency provides selectivity that can be used to define multiple communications channels.

15 Claims, 17 Drawing Sheets

———— ANTENNA 18
— — — ANTENNA 14
— - — - ANTENNA 16
—•— SUM OF 3 ANTENNAS

COMMUNICATIONS SYSTEM

CROSS-REFERENCE TO RELATED APPLICATIONS

This is a continuation of U.S. patent application Ser. No. 09/064,525, filed Apr. 23, 1998, now U.S. Pat. No. 6,271,790, which is a continuation-in-part of U.S. patent application Ser. No. 08/853,833, filed May 9, 1997, now U.S. Pat. No. 6,204,810, the entire contents of which are incorporated herein by reference.

BACKGROUND OF THE INVENTION

1. Field of the Invention

The present invention relates generally to communications systems. More specifically, the present invention relates to a communication system in which an information-modulated electromagnetic wave has a carrier frequency and an electric field corresponding to a rotation vector tracing a nonlinear predictable path at a second frequency that is less than the carrier frequency of the wave.

2. Description of the Related Art

An electromagnetic wave can be defined by an electric field and a magnetic field that are orthogonal to one another along an axis of propagation. The behavior of the wave can be described with respect to the orientation of the field vector of the electric (E) field.

Polarization is a term that can be used to characterize the orientation of the field vector of an E field of some electromagnetic waves. Different types of polarization include: linear (also referred to as plane), circular, and elliptical polarization.

Where the field vector of an E field propagates within a plane as the wave propagates along an axis, the polarization of the wave is referred to as linear or plane polarization. Where the terminus of the E field, i.e., the extremity of the field vector, in a given plane perpendicular to the axis of propagation traces a circular path rotating about the axis of propagation at a frequency equal to the frequency of the wave, the polarization is referred to as circular polarization. Similarly, where the terminus of the E field, in a given plane perpendicular to the axis of propagation, traces an elliptical path rotating about the axis of propagation at a frequency equal to the frequency of the wave, the polarization is referred to as elliptical polarization, a general case of circular polarization.

Polarized waves can be transmitted or received in a number of different ways. For example, an antenna itself can impose a certain polarization upon a transmitted wave or be sensitive to received waves of a certain polarization. A dipole antenna oriented horizontally with respect to the earth is suited to receive and/or transmit linearly polarized waves where the plane of polarization is parallel to the earth. Similarly, a dipole antenna oriented vertically with respect to the earth is suited to receive and/or transmit linearly polarized waves where the plane of polarization is perpendicular to the earth's surface. A helical antenna is suited to receive and/or transmit circularly polarized waves.

Communications systems transmitting and receiving polarized waves can be adversely affected by apparent prolonged fading of transmitted/received waves having only one type of polarization. To minimize fading of the amplitude of the received wave having the one type of polarization, communication systems can be designed to transmit and receive multiple waves each having a different polarization. This method can be characterized as polarization diversity.

Polarization has also been used to avoid inter-channel interference in, for example, satellite communications systems. A satellite can communicate with a ground station using right-hand (i.e., clockwise (CW)) circular polarized waves at a given carrier frequency, while an adjacent satellite can communicate with another ground station at the same carrier frequency using left-hand (i.e., counterclockwise (CCW)) circular polarized waves. Helical antennas having opposite twists can be used to receive and/or transmit left-hand and right-hand circular polarized waves.

Polarization can be used to encode information in a communications system. U.S. Pat. No. 4,084,137, issued to Welti, describes a communications system that encodes a horizontally polarized wave and a vertically polarized wave in accordance with information. U.S. Statutory Invention Registration H484 describes a similar system that addresses a sidelobe problem in a radar system.

The polarization encoding concept addressed in the references described above can also be used to minimize the likelihood of unauthorized interception of a message. U.S. Pat. No. 5,592,177, issued to Barrett, describes a communications system that sequentially changes the polarization of a signal-carrying wave in a pseudorandom manner. The Barrett system provides broad polarization bandwidth for transmitting and/or receiving signals while minimizing the required frequency bandwidth of the transmitter and receiver systems. The selected polarizations include linear polarization with a variable polarization plane orientation, right-hand and left-hand circular polarizations, and right-hand and left-hand elliptical polarizations with a variable ellipse major axis orientation. By changing the specific polarization, the signal is spread in polarization in a manner analogous to the spreading of a signal over a continuous range of frequencies in spread spectrum communications systems. Note that when the signal-carrying wave is circularly or elliptically polarized, the field vector of the generated E field is rotating a frequency equal to the carrier frequency.

The concept of transmitting separately encoded horizontally polarized waves and encoded vertically polarized waves can also be used for channel discrimination in a two-channel communications system in which the channels have the same carrier frequency. U.S. Pat. No. 4,521,878, issued to Toyonaga, describes a communications system that encodes a horizontally polarized wave and a vertically polarized wave in accordance with a first code to form a signal corresponding to a first channel, and encodes a horizontally polarized wave and a vertically polarized wave in accordance with a second code to form a signal corresponding to a second channel. The system thus improves cross-polarization discrimination over known systems that attempt to simply transmit a first channel using horizontal polarization and a second channel using vertical polarization.

These known communications systems, however, suffer shortcomings. Regardless of the type of polarization used by the known communications systems, the E-field vector of an electromagnetic wave is either linearly polarized or elliptically polarized and consequently rotates about the axis of propagation at a frequency that equals the carrier frequency of the wave.

SUMMARY OF THE INVENTION

The present invention can increase the amount of information carried by a communications system for a given carrier frequency. The present invention increases the amount of information carried by a communications system within a discrete carrier in an appropriate medium by producing more than one information channel for each carrier frequency within the frequency allocation.

The selectivity of the present invention results in lower noise and therefore creates a higher signal-to-noise ratio for an information channel. The present invention provides an information channel where the noise is limited to characteristics of the channel.

The present invention relates to a communications system in which a communications channel is defined at least in part by an electromagnetic wave having a carrier frequency and an electric (E) field vector the extremity of which traces a non-linear periodic path (or a predictable path whose rate of change about the axis of propagation is at a frequency less than the carrier frequency) at a second frequency less than the carrier frequency from the perspective of an observer located at a plane perpendicular to the axis of propagation of the wave. The transmitter of the communications system creates an electromagnetic wave having such characteristics and which is modulated with information in a suitable manner. The receiver of the communications system is sensitive to the periodic path and carrier frequency of the E-field vector. The combination of E-field vector path and the carrier frequency provides selectivity that can be used to define a communications channel.

In certain exemplary embodiments of the invention, a communications channel is defined at least in part by an electromagnetic wave with an E-field vector, as projected onto or from the perspective of a plane transverse to the axis of propagation, rotating at a selected angular velocity that is less than and independent of the carrier frequency. The transmitter and receiver of the system are each synchronized to a rotation frequency that defines the angular velocity.

Although in certain embodiments the E-field vector can remain at a selected second frequency for an indefinite time interval, such as that which is sufficient to communicate an entire message, in other embodiments the E-field vector can change from one second frequency to another at any suitable predictable manner whereby the system can communicate some amount of information between changes, however large or small that amount of information may be. Frequency hopping and sequencing constitute a class of communications techniques that can readily be applied to the present invention in view of these teachings whether to the carrier frequency or to the rate of rotation of the E field vector about the axis of propagation.

In another embodiment of the present invention, a transmitter using a single carrier frequency produces a wave having an E-field vector that rotates at an angular velocity less than the carrier frequency. The transmitter can produce the wave by providing a rotation frequency signal source, an antenna system having two or more elements, and two or more phase systems, each corresponding to one of the antenna elements. In such an embodiment, each phase system includes a suitable time-delay, such as a delay line or a phase shifter, that delays the rotation frequency signal by a fixed amount such that the sum of the delays becomes a constant value. Each phase system also includes a suitable amplitude modulator, such as a voltage-variable attenuator, a balanced modulator, or other device, that amplitude modulates the information-modulated carrier signal with the time-delayed rotation frequency signal. Each antenna element receives the amplitude-modulated output of one of the phase systems. In one embodiment of the present invention, the antenna elements are dipoles aligned at different angular orientations.

In another embodiment of the present invention, a receiver using a single carrier frequency can recover the information signal from a wave having an E-field vector rotating at an angular velocity less than the carrier frequency. The receiver can recover the information signal by providing a rotation frequency signal source, an antenna system having two or more elements, two or more phase systems, each corresponding to one of the antenna elements, and a combiner. Although the wave impinges upon each antenna element, each antenna element produces a corresponding received signal that represents only one projection component of the wave. Each phase system is essentially the inverse of that provided in the transmitter described above. As in the transmitter, each phase system includes a suitable time-delay, such as a delay line or a phase shifter, that delays the rotation frequency signal by a different but known amount. Each phase system also includes a suitable amplitude modulator, such as a voltage-variable attenuator, a balanced modulator, a single balanced mixer, a double balanced mixer, or other device, that gates the received signal provided by the corresponding antenna element in accordance with the time-delayed rotation frequency signal. Because the rotation frequency signal defines a channel characteristic, signals outside the channel are attenuated. The combiner sums the detected amplitude-modulated signals produced by the phase systems. In one embodiment of the present invention, the antenna elements are dipoles aligned at different angular orientations.

In another embodiment of the present invention, a transmitter sends two waves each having a different carrier frequency and having opposite circular polarizations to produce a resulting superposed wave having its own carrier frequency and an E-field vector that rotates about the propagation axis at a frequency less than the new carrier frequency. The transmitter can produce the wave by providing a compound antenna system, a lower differential carrier frequency source, an upper differential carrier frequency source, and two synchronized amplitude modulators. The upper and lower differential carrier frequency sources produce upper and lower differential signals, respectively. The upper differential signal has a frequency equal to the carrier frequency plus the rotation frequency, and the lower differential signal has a frequency equal to the carrier frequency minus the rotation frequency. The average of the differential signals corresponds to the new carrier frequency of resultant wave. One of the amplitude modulators modulates the upper differential signal with an information signal, and the other modulates the lower differential signal with the same information signal. Each of the information-modulated differential signals is coupled to one of the antenna elements.

In one embodiment of the present invention, the antenna system includes a compound antenna having two helical antenna elements each producing waves with E-field vectors rotating about the axis of propagation in opposite directions. The antenna element driven by the differential carrier signal having the higher of the two frequencies dictates the direction of rotation about the propagation axis of the E-field vector of the resulting wave. The E-field vector of the resulting wave rotates about the propagation axis in a clockwise direction if the antenna element having a clockwise twist is driven by the upper differential signal, and the antenna element having a counterclockwise twist is driven by the lower differential signal. The E-field vector of the resulting wave rotates about the propagation axis in a counterclockwise direction if the antenna element having a counterclockwise twist is driven by the upper differential signal, and the antenna element having a clockwise twist is driven by the lower differential signal.

In another embodiment of the present invention, a receiver tuned to two differential carrier frequencies can recover the information signal from a wave having an E-field vector rotating about the propagation axis at a rotation frequency less than the average of the two carrier frequencies. The receiver can recover the information signal by providing two filters, one coupled to one antenna element and the other coupled to another antenna element of a dual antenna system, a summing circuit coupled to the filters for summing the received upper and lower differential signals, and an amplitude modulation detector circuit coupled to the output of the summing circuit. One filter has a passband centered around the lower differential frequency, and the other has a passband centered around the upper differential frequency.

In one embodiment of the receiver, the antenna system includes a compound antenna having two helical antenna elements each receiving wave components of the resultant wave: received wave components have E-field vectors rotating about the propagation axis in opposite directions and superpose to the resultant wave. Each received wave component corresponds to the information-modulated differential signals sent by the transmitter.

Note that the transmitted carrier has no effective sidebands from the perspective of the resulting channel; the term "sideband" is used herein only for convenience with respect to certain embodiments. The term merely evokes the concept that the transmitted signal would have sidebands from the perspective of the resulting channel were it not for the summation of the energy radiated by the antenna elements of the antenna system. The quadrature summation cancels the frequencies that a single antenna element would radiate in the absence of the other antenna elements.

In the embodiments of the present invention in which the extremity of the E-field vector of the electromagnetic wave rotates at a second frequency that is less than the carrier frequency, the quantity E curl H of the propagating wave remains constant, where E is the electric field vector and H is the magnetic field vector, when the wave is not modulated with information. The quantity E curl H represents the total energy of the field. Of course, when the wave is modulated with information, the quantity E curl H of the wave no longer remains constant.

The communication system of the present invention may be used in any suitable dielectric medium that supports oriented electromagnetic waves, such as air, free space, waveguides, and optical fiber.

Although the embodiments described above relate to a communications system in which a communications channel is defined by a selected E-field vector rotation frequency of a electromagnetic wave that is less than the carrier frequency of the wave, more generally, the invention relates to a system in which a communications channel is defined at least in part by a wave having a carrier frequency and an E-field vector, the extremity of which traces a non-linear periodic path at a second frequency (i.e., a rotation frequency) less than the carrier frequency from the perspective of an observer located at a plane perpendicular to the axis of propagation of the wave. Thus, the path the extremity of the E-field vector may trace is not limited to a regular path as described above that results from rotation of the E-field. Rather, it may include other non-linear paths that are more irregular. In the general case, the path of the extremity of the E-field vector traces a predictable path where the frequency of the change of path is less than the carrier frequency. For example, the path may be defined by a pseudorandom sequence generator. Essentially any non-linear periodic path (or more generally, any non-linear path) that both a transmitter and receiver of a communications system can follow in synchronism, for example, at a rotation frequency less than the carrier frequency, would be suitable.

A Poincare sphere is a graphical representation that comparatively illustrates polarizations. The poles of the sphere represent right-hand and left-hand circular polarizations. Points on the equator represent linear polarizations of various orientations with respect to horizontal and vertical. Points on one hemisphere represent various right-hand elliptical polarizations, and points on the other hemisphere represent various left-hand elliptical polarizations. A conventional Poincare sphere is not sufficient to describe the E-field vector path of waves that behave in accordance with the present invention because a Poincare sphere describes only waves having conventional circular, elliptical and linear polarizations, i.e., waves having E-field vector extremities that follow circular, elliptical and linear periodic paths at a frequency equal to the carrier frequency of the wave.

Nevertheless, in embodiments of the present invention where the E field rotates from the prospective of a plane perpendicular to the propagation axis, if one considers a Poincare sphere in a novel or modified manner such that its radius corresponds to the carrier frequency, then the interior of the sphere describes waves that behave in accordance with to certain embodiments of the present invention. (The interior of a conventional Poincare sphere has no meaning in the prior art; only the surface is relevant.) Points near the center of such a modified Poincare sphere would describe waves having E-field vectors rotating at a frequency near zero. Points on any spherical radial axis extending between the center and the surface of the sphere describe waves that behave in accordance with the present invention. In particular, the points on the polar axis between the center and the poles would describe waves having an E-field vector that rotates at a rotation frequency less than the carrier frequency as described above with respect to certain embodiments. Each point or interval on the polar axis could be used to define a discrete communications channel.

The wave may be modulated with information in any suitable manner. Although as described above the carrier frequency is amplitude modulated with the information, it is believed in accordance with the present invention that the carrier frequency may be frequency modulated with information or modulated with the information in any other suitable manner. For example, the second frequency (i.e., the rotation frequency) at which the extremity of the E-field vector traces the path may be modulated with information. Where the extremity of the E-field vector traces a path at a modulated second frequency (i.e., a modulated rotation frequency), the deviation of the wave from the basic rotation frequency (i.e., the non-information-modulated rotation frequency) represents the information in a manner analogous to that in which the deviation of a conventional frequency modulated signal from a center channel frequency represents the information.

The foregoing, together with other features and advantages of the present invention, will become more apparent when referring to the following specification, claims, and accompanying drawings.

DETAILED DESCRIPTION

For convenience, the detailed description of the present invention will be discussed in two sections: communications systems based on a single carrier signal and communications systems based on two different carrier signals.

Communications Systems Based on a Single Carrier Signal

Figure 15:
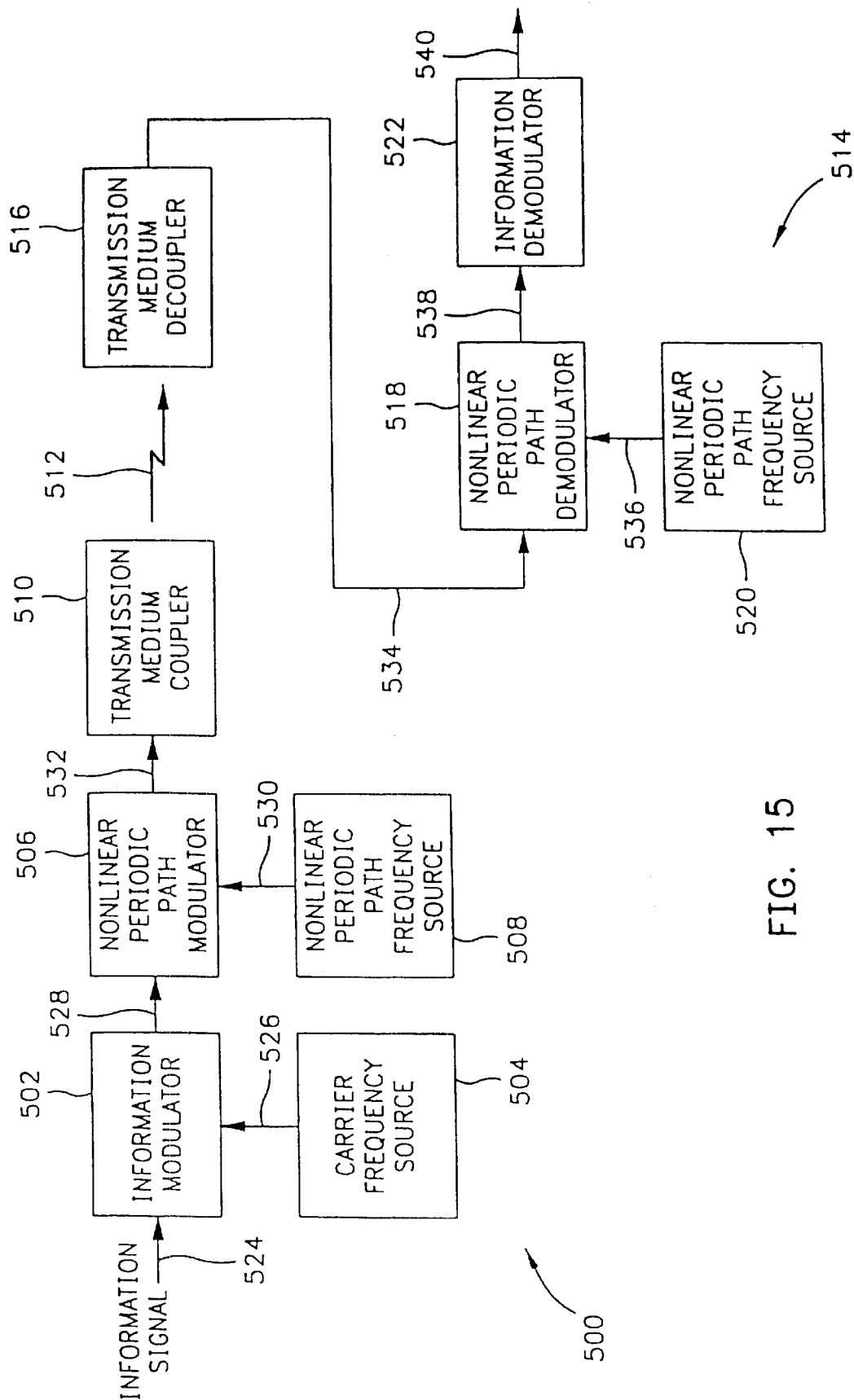
FIG. 15 is a block diagram of a communications system using a single carrier signal according to an embodiment of the present invention.

FIG. 15 is a block diagram of a communications system using a single carrier signal according to an embodiment of the present invention. In FIG. 15, a transmitter 500 includes information modulator 502, carrier frequency source 504, nonlinear periodic path modulator 506, nonlinear periodic path frequency source 508 and transmission medium coupler 510. Transmitter 500 sends electromagnetic (EM) wave 512 through a transmission medium (not shown) to receiver 514. Receiver 514 includes transmission medium decoupler 516, nonlinear periodic path demodulator 518, nonlinear periodic path frequency source 520 and information demodulator 522.

Information modulator 502 receives information signal 524 and carrier frequency signal 526 from carrier frequency source 504 to produce information-modulated signal 528. Information signal 524 can be any suitable analog signal produced by any suitable source, such as a video signal or an audio signal, that it is desired to communicate to receiver 514 (or other suitable receiver). Similarly, information signal 524 can be in digital format.

Carrier frequency source 504 can include any suitable circuits or systems, such as a conventional sine-wave generator or oscillator, for providing carrier frequency signal 526. As in any communications system, carrier frequency signal 526 should have a frequency that facilitates its modulation with information signal 379 for the given transmission medium.

Nonlinear periodic path modulator 506 receives nonlinear periodic path frequency signal 530 from nonlinear periodic path frequency source 508 and information-modulated signal 528 to produce signal 532. Nonlinear periodic path frequency source 508 can include any suitable circuits or systems, such as a conventional sine-wave generator or oscillator, for providing nonlinear periodic path frequency signal 530. Nonlinear periodic path frequency signal 530 has a frequency between the carrier frequency and zero; nonlinear periodic path frequency signal 530 defines the information channel. The frequency of nonlinear period path frequency signal 530 is between the carrier frequency and zero in the sense that it is less than (and does not include) the carrier frequency and greater than (and does not include) zero.

Nonlinear periodic path modulator 506 amplitude modulates signal 528 with an envelope having a frequency equal to nonlinear periodic path frequency signal 530 on to information-modulated signal 528 to produce a resultant signal 532. The envelope can be, for example, a sinusoidal signal having a frequency equal to the nonlinear periodic path frequency. In certain embodiments of the invention, signal 528 can be amplitude modulated with the envelope. For example, signal 528 can be divided into at least two component signals; these component signals can be then amplitude modulated with a phase-delayed duplicate of the envelope having a frequency equal to the nonlinear periodic path frequency to produce resultant signal 532. In other words, signal 528 can be divided into at least two component signals and then amplitude modulated with phase-delayed duplicates of the envelope. The envelope duplicates have a staggered phase delay corresponding to the arrangement of the antenna elements of transmission medium coupler 510. Similarly, signal 528 can be divided into a number of component signals corresponding to the antenna elements of transmission medium coupler 510.

Where transmission medium coupler 510 comprises a group of angularly separated co-planar antenna monopoles, the performance of transmission medium coupler 510 may be related to the number of antenna monopoles: the more antenna monopoles used, the better the performance that should be expected although with diminishing returns. It is expected that the optimal number of antenna monopoles is approximately nine monopoles.

For at least the reason of simplicity, an example of transmission medium coupler 510 with three antenna monopoles will be discussed below. For example, where transmission medium coupler 510 comprises three co-planar antenna monopoles each angularly separated about a common point by 120 degrees, signal 528 is divided into three component signals and the envelope duplicates have a staggered phase delay equal to 360 degrees (or 2π radians) divided by three. One envelope duplicate will have a zero degree phase shift, another envelope duplicate will have a 120 degree phase shift, and the third envelope duplicate will have a 240 degree phase shift. Each of the three component signals is then amplitude modulated with a phase-delayed duplicate of the envelope to produce three components of resultant signal 532. In such an embodiment of the invention, transmission medium coupler 510 receives resultant signal 532. Transmission medium coupler 510 produces an EM wave 512 having an E-field vector rotating about the axis of propagation at a rotation frequency between the carrier frequency and zero.

The term "rotation frequency" is used herein in reference to the rate at which the E-field vector rotates about the propagation axis from the perspective of a plane perpendicular to the propagation axis. The E-field vector rotates about the propagation axis in a specific sense: as the extremity or terminus of the E-field vector traces a nonlinear path, which can include passing through the point (in the plane perpendicular to the propagation axis) corresponding to the propagation axis, the E-field vector traces one rotation about the propagation axis when starting at and returning to a particular angular position. Consequently, in considering the rotation frequency in dimensional units of cycles per second, the E-field's rotation about the propagation axis starting from and returning to a specific angular position equals one cycle. The rotation frequency at which E-field vector rotates about the axis of propagation is between the carrier frequency and zero in the sense that it is less than (and does not include) the carrier frequency and is greater than (and does not include) zero.

In another example, transmission medium coupler 510 comprises three co-planar antenna monopoles angularly separated from a common point by unequal amounts; for example, the first and second monopoles separated by 90 degrees, the second and third monopoles separated by 150 degrees and the third and first monopoles separated by 120 degrees. In such a case, signal 528 is divided into three component signals, and the envelope duplicates have phase delays corresponding to the arrangement of the monopoles. More specifically, one envelope duplicate will have a zero degree phase shift, another envelope duplicate will have a 90 degree phase shift, and the third envelope duplicate will have a 150 degree phase shift to produce three components of resultant signal 532. Transmission medium coupler 510 receives resultant signal 532. In such an embodiment of the invention, transmission medium coupler 510 produces an EM wave 512 having an E-field vector rotating about the axis of propagation at a rotation frequency between the carrier frequency and zero.

Figure 6A:
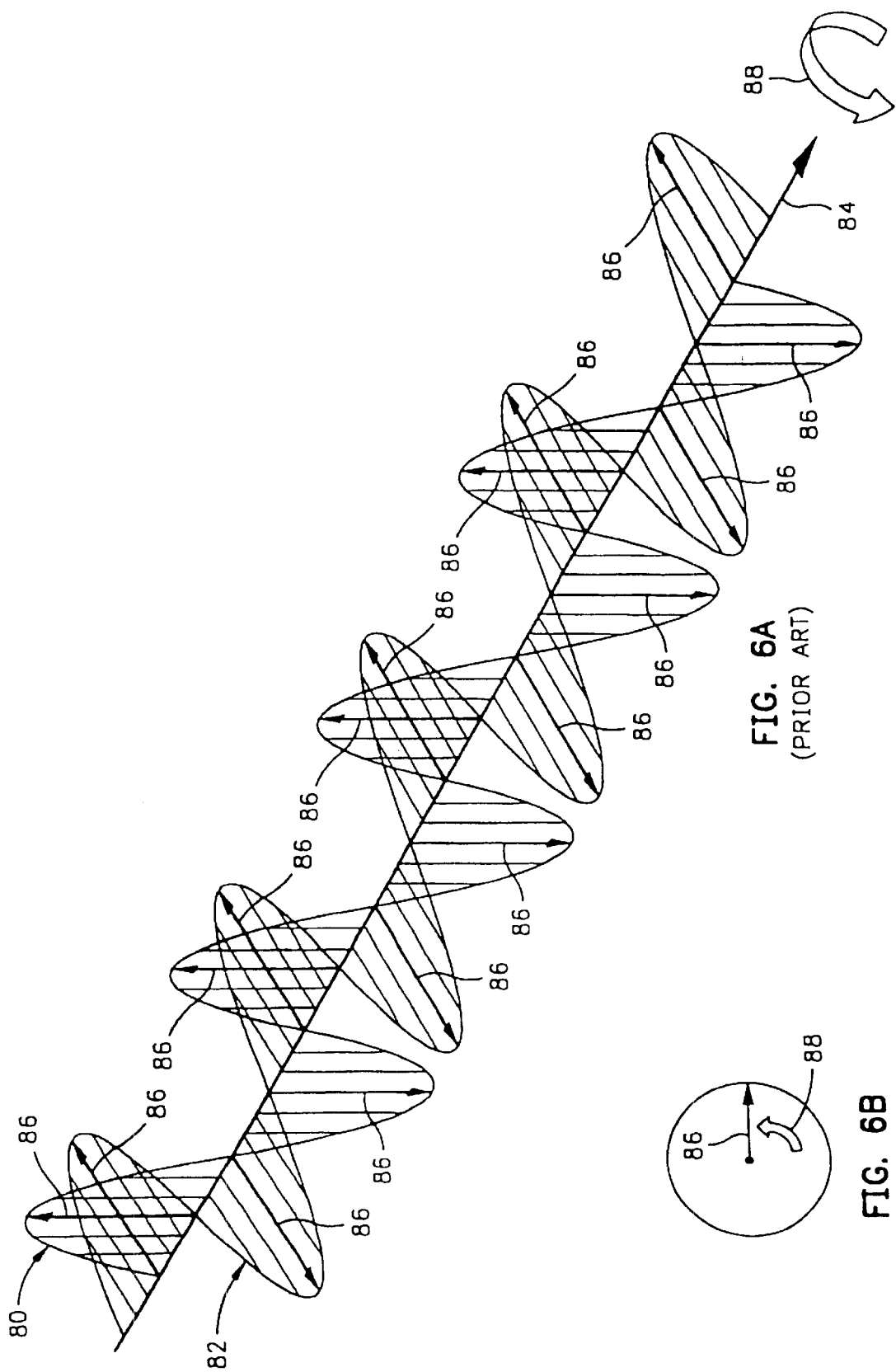
FIG. 6A illustrates a wave having two orthogonal electric field (E-field) components that are 90 degrees out of phase and have constant, equal amplitudes.

FIGS. 6A–8B explain the differences between a circularly polarized wave of the prior art and EM wave 512 of FIG. 15. FIG. 6A illustrates two orthogonal E-field components 80 and 82 of a propagating EM wave that have equal, constant amplitudes and that are 90 degrees out of phase. The resultant or vector sum of E-field components 80 and 82 defines a circularly polarized wave as is generally known.

Figure 6B:
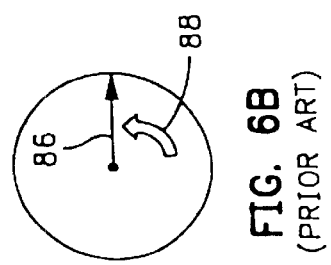
FIG. 6B illustrates rotation of the resultant E-field vector of the wave in FIG. 6A about an axis of propagation.

The rotating E field of a circularly polarized wave can be visualized with respect to a given plane perpendicular to the axis of propagation. In the wave illustrated in FIG. 6A, the resultant E-field vector viewed from that plane rotates about the axis of propagation 84 at a rate equal to the frequency of the wave. Resultant E-field vector 86 at a spatially fixed point on each cycle of the wave is shown at various points in time. Vector 86 is selected for illustrative purposes because it is located at a point on the wave at which one of E-field components 80 and 82 has a zero amplitude, thereby simplifying the vector addition for illustrative purposes. From the perspective of an observer looking into axis of propagation 84, i.e., with the wave propagating toward the observer, E-field vector 86 appears to rotate about the axis of propagation in a circular path, as illustrated in FIG. 6B, in the angular direction of arrow 88. E-field vector 86 rotates at the same angular velocity (i.e., rotates about the axis of propagation at the same frequency) as the frequency of the wave. In other words, E-field vector 86 completes one revolution per cycle of the wave; said another way, E-field vector 86 completes one revolution about the axis of propagation for every cycle of the wave.

Figure 7A:
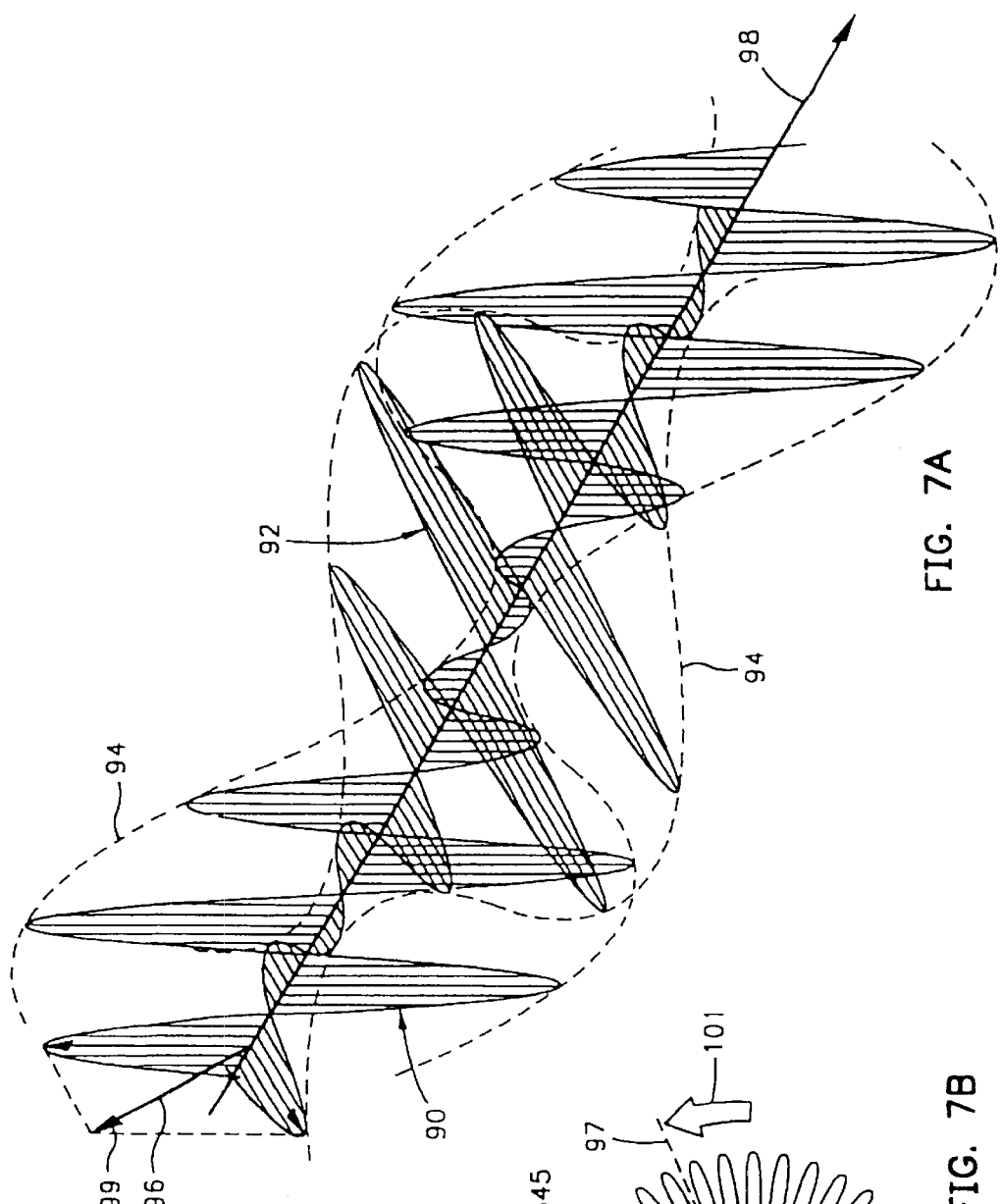
FIG. 7A illustrates an example of a wave generated according to an embodiment of the present invention where the E field of the wave rotates about the axis of propagation at a frequency less than the carrier frequency.

FIG. 7A illustrates an example of a wave generated according to an embodiment of the present invention where the E-field vector rotates at an angular velocity that is less than the frequency of carrier frequency signal 526. Note that the term "angular velocity" as applied herein to the wave generated according to an embodiment of the present invention has a special meaning and is defined in detail below. The exemplary wave illustrated in FIG. 7A can also be described as having its E-field vector rotating around the axis of propagation 98 at a rotational frequency that is less than its carrier frequency signal.

Figure 7B:
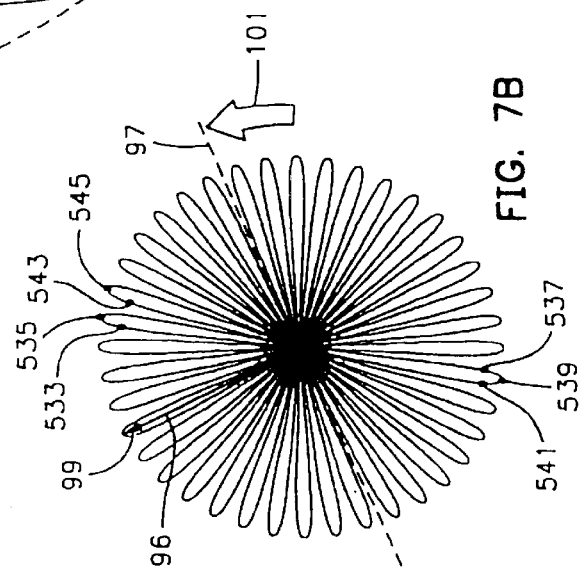
FIG. 7B illustrates rotation of the E field of the wave in FIG. 7A about the propagation axis from the perspective of a plane perpendicular to the propagation axis.

Unlike FIG. 6A, two orthogonal E-field components 90 and 92 of a propagating EM wave have amplitudes that change in accordance with a modulation envelope 94. Resultant E-field vector 96, the superposition of components 90 and 92, is shown in FIG. 7A at an exemplary point on the wave at an exemplary point in time. From the perspective of an observer looking into the axis of propagation 98, as shown in FIGS. 7A and 7B, resultant E-field vector 96 appears to rotate about the axis of propagation 98 at a frequency less than the carrier frequency.

Figure 8A:
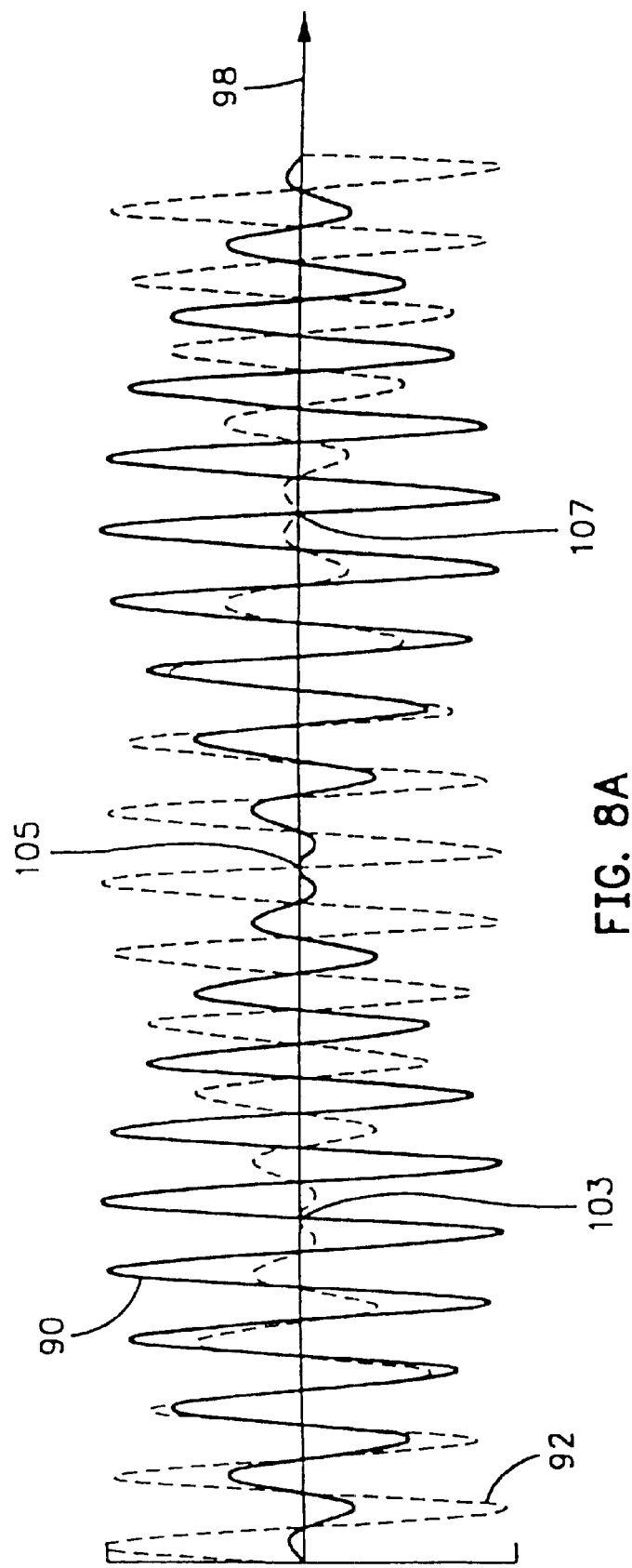
FIG. 8A illustrates the relative amplitudes of the E-field components of a wave generated according to an embodiment of the present invention where the E field of the wave rotates about the axis of propagation at a rotation frequency less than the carrier frequency.

FIG. 8A illustrates the relative amplitudes of E-field components 90 and 92. Note the 180 degree phase shift at the zero points at which the amplitude envelopes cross the axis of propagation. This 180 phase shift is indicative of double sideband—suppressed carrier and, as discussed below, results from the device used (e.g., a balanced mixer modulator) to add the modulation envelope 94 to the E-field components 90 and 92.

More precisely stated for the example illustrated by FIGS. 7A, 7B, 8A and 8B, the terminus of the resultant E-field vector rotates about axis of propagation to traverse a path that can be characterized as rosette-shaped. In other words, resultant E-field vector 96 shown in FIG. 7A has a terminus 99 shown in FIGS. 7A, 7B and 8B; from the prospective of an observer located at a plane perpendicular to axis of propagation 98, terminus 99 of resultant E-field vector 96 traces a rosette-shaped path.

The path traced by terminus 99 of resultant E-field vector 96 can be further illustrated by reference to points 554 to 533. Terminus 99 traces a path, in part, defined by the sequential progression of points 545, 543, 541, 539, 537, 535 and 533. In other words, at a given time, terminus 99 is located at point 545; at a later time, terminus 99 is located at point 541; at a later time, terminus 99 is located at point 539; and so on until terminus 99 is located at point 533. The frequency at which terminus 99 of resultant E-field vector 96 traces the path from point 545 to point 533 equals the carrier frequency of wave 512 (FIG. 15). For the particular path illustrated by FIG. 7B, the rotation frequency equals the frequency at which terminus 99 of resultant E-field vector 96 traces the path from 545 through point 533, through the remaining portion of the rosette, and back to point 545 FIG. 7B illustrates the rotation frequency being between the carrier frequency and zero; the time for the resultant E-field vector to trace the path from point 545 to point 533 (associated with the carrier frequency) will be less than the time for the resultant E-field vector to trace the path from point 545 through point 533, through the remaining portion of the rosette, and returning to point 545.

Generally speaking, where the nonlinear path traced by the E-field vector can be characterized as a rosette path, the particular shape of the rosette traced by the terminus of the resultant E-field vector can vary widely based on the relationship between the carrier frequency and frequency about which the E-field vector rotates about the axis of propagation. For example, when the rotational frequency equals 1/20th of the carrier frequency, the terminus of the E-field vector traces forty rosette "petals" to return to the same relative position within the rosette pattern; this is the example illustrated in FIG. 7B (i.e., the terminus of the E-field vector starting at point 545 traces forty rosette petals to return to point 545). In an alternative example, where the rotational frequency equals 1/9th of the carrier frequency, the terminus of the E-field vector traces nine rosette "petals" to return to the same relative position within the rosette pattern.

In cases where the rotational frequency is not an integral fraction of the carrier frequency, the rosette path traced by the terminus of the E-field vector in one complete rotation about the propagation axis will not necessarily be aligned with the rosette path traced by the terminus of the E-field vector in another complete rotation about the propagation axis. In other words, once the rosette pattern has been traced in the time period associated with the rotational frequency, the rosette pattern traced in the next interval of time period associated with the rotational frequency may not overlap with the previously traced rosette pattern, of course as viewed from the perspective of given plane perpendicular to the axis of propagation.

Note that the concept of the terminus of the E-field vector rotating about the axis of propagation can include cases in addition to those where the terminus of the E-field vector traces a path completely about the propagation axis. In other words, nonlinear paths traced about the axis of propagation by the E-field terminus can include those paths where the terminus traces less than completely and continuously 360 degrees about the propagation axis as viewed from the perspective of given plane perpendicular to the axis of propagation. For example, in the case where the rotational frequency equals one third of the carrier frequency, the terminus of the E-field vector traces in the time period associated with the rotational frequency three rosette petals angularly separated by 120 degrees with angular gaps within which the terminus does not trace; in this case, the E-field vector rotates about the propagation axis in a noncontinuous manner and without being located at all angular positions within 360 degrees. In other cases, the terminus of the E-field vector will not trace all angular positions within 360 degrees during one time period associated the rotational frequency, rather it may take more than one time period (each time period being associated with the rotational frequency) for all angular positions within 360 degrees to be traced. An example of this later case is where the carrier frequency is 1.5 times greater than the rotational frequency.

Note that the use of the term "rosette" is for convenient description and is not intended to be limiting. The nonlinear path, from the perspective of a plane perpendicular to the propagation axis, may have paths other than a rosette-shaped path where the rotation frequency of the E-field vector is between the carrier frequency and zero.

The nonlinear path traced about the axis of propagation by the E field can be alternatively described in reference to an orientation line. For example, an angular position of resultant E-field vector 96 can be associated with orientation line 97. Orientation line 97 indicates the angular position of resultant E-field vector 96 with respect to axis of propagation 98. When terminus 99 of resultant E-field vector 96 is located at point 545, orientation line 97 is slightly clockwise of vertical. As terminus 99 traces the path defined, in part, by the sequential progression of points 545 through 533, orientation line 97 rotates in the direction of arrow 101 (shown as counterclockwise in FIG. 7B). For example, when terminus 99 has moved from point 545 to point 543, orientation line 97 has moved to a position slightly less clockwise of vertical; when terminus 99 has moved to point 541, line 97 has moved to a position even less clockwise of vertical; and so on, until terminus 99 has moved to point 533, at which time line 97 is approximately vertical.

Note that orientation line 97 is defined so that it represents both one angular position of E-field vector 96 and the angular position of E-field vector 96 angularly displaced by 180 degrees. Under this definition, the orientation line 97 changes continuously through 360 degrees as the terminus of the E-field vector traces a nonlinear path.

Figure 8B:
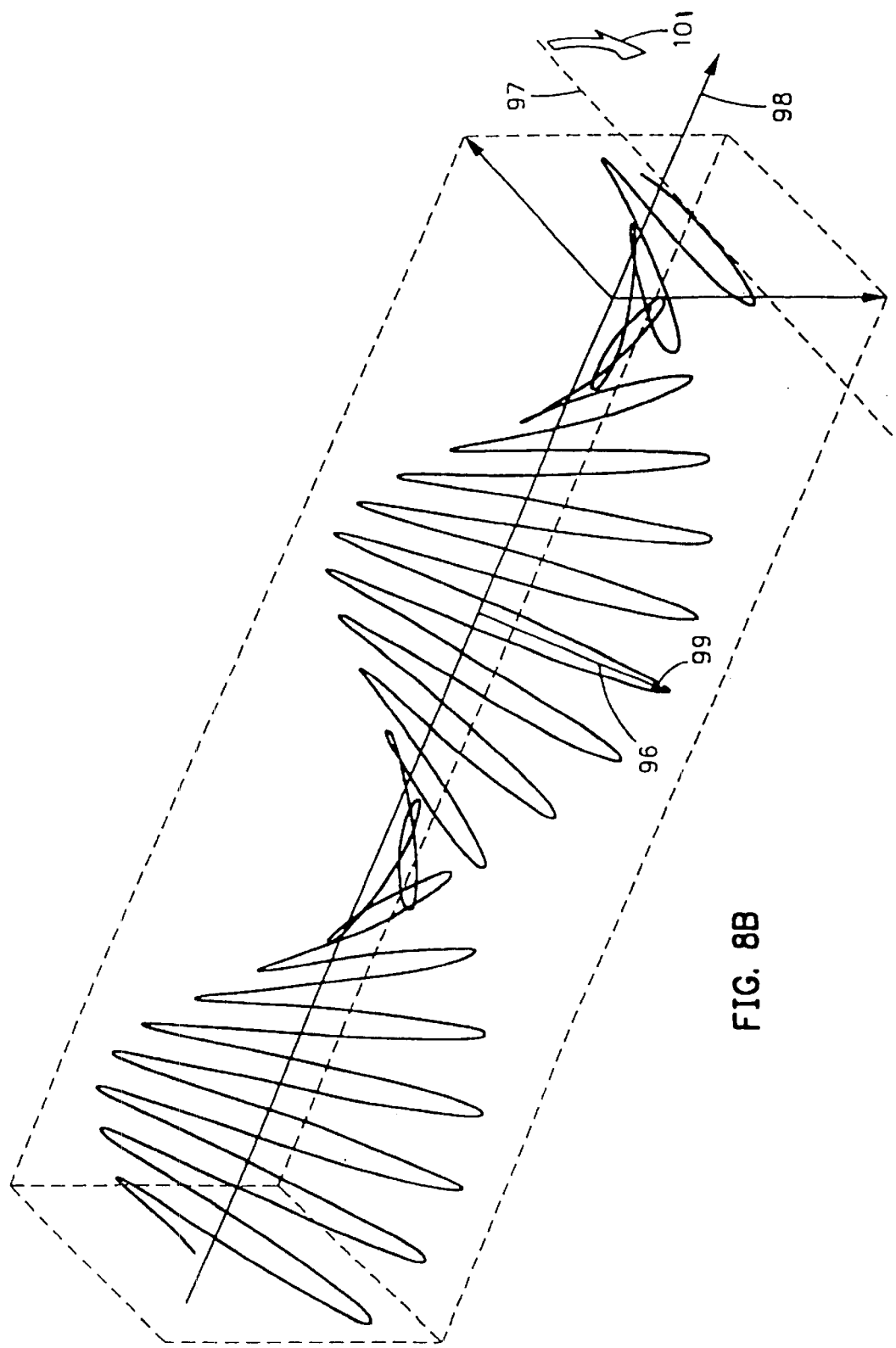
FIG. 8B illustrates the path traced by the extremity of the resultant E-field vector of a wave generated according to an embodiment of the present invention where the E field of the wave rotates about the axis of propagation at a rotation frequency less than the carrier frequency.

Following the example illustrated in FIGS. 7B and 8B, the term "angular velocity" can be defined as the angular rate of change of the orientation line associated with the E-field vector from the perspective of a plane perpendicular to the propagation axis. In other words, the angular velocity is the rate at which orientation line 97 rotates about axis of propagation 98 from the prospective of an observer located at a given plane perpendicular to axis of propagation 98.

FIG. 8B is a perspective view of terminus 99 of resultant E-field vector 96, illustrating that it takes a twisting path through space as the wave propagates. As orientation line 97 indicates, the resultant E-field vector 96 rotates about axis of propagation 98 as the wave propagates. The twisting path traced by the E-field can be modeled for illustrative purposes by grasping opposite ends of a strip of paper and twisting one of them. Note that the term "twisting" refers to the path and not to the E field itself. In other words, the E-field of course does not twist in the sense that its angular orientation changes while the wave is propagating through space; rather, like a conventional electromagnetic wave, each portion of the propagating wave remains in the orientation in which it emanated from the antenna or other transmitting device. Correspondingly, the E-field vector does not trace a rosette or other path in the sense that the angular orientation of a given vector, i.e., a selected portion of a wave, changes while the wave is propagating through space. These angular changes with respect to time are only sensed or experienced from the perspective of a transverse plane at a fixed location in space on the axis of propagation. The angular changes are experienced because successive portions of the propagating wave having differing angular orientations reach the transverse plane at successive points in time. FIG. 8B and similar illustrations are snapshots in time of a propagating wave.

Stated yet another way, in terms of the wave shown in FIG. 7A, the amplitude modulation defined by envelope 94 results in the angular velocity of the resultant E-field vector 96 being less than its carrier frequency and less than the angular velocity of the E-field vector for the circularly polarized wave shown in FIG. 6A (having the same carrier frequency of the wave shown in FIG. 7A). Similarly, the amplitude modulation defined by envelope 94 results in the resultant E-field vector 96 rotating about the propagation axis at a frequency less than its carrier frequency and also less than the frequency at which the E-field vector of a circularly polarized wave (having the same carrier frequency of the wave shown in FIG. 7A) rotates about its axis. In an analogous manner, the amplitude modulation defined by the envelope associated with nonlinear periodic path frequency signal 530 described above with respect to FIG. 15 results in the E-field vector of the resultant transmitted wave 512 rotating about the propagation axis at a frequency less than its carrier frequency and also at an angular velocity less than the angular velocity of the E-field vector for the circularly polarized wave shown in FIG. 6A.

The selected rotation frequency defines the extent to which the resultant E-field vector rotates about the propagation axis at a rotation frequency less than the wave's carrier frequency. Note that FIG. 7A is for illustrative purposes; the present invention is not limited to a wave constructed from two orthogonal components.

In view of the discussion above relating to FIGS. 7A and 7B, a generalization regarding embodiments of the present invention that produce such a wave is that resultant E-field vector 96 traverses a rosette pattern, which is a type of non-linear periodic path. More specifically, such embodiments produce a wave defined by an E-field rotating about the propagation axis at a rotation frequency between the carrier frequency and zero. Similarly, such embodiments produce a wave defined by an E field having an angular velocity less than the angular velocity associated with a circularly polarized wave and greater than zero.

Referring again to FIG. 15, receiver 514 receives EM wave 512 at transmission medium decoupler 516 which produces signal 534. Nonlinear periodic path demodulator 518 receives signal 534 and nonlinear periodic path signal 536 from nonlinear periodic path frequency source 520 to produce signal 538. Nonlinear periodic path frequency source 520 can be identical to nonlinear periodic path frequency source 508. In an embodiment in which the envelope imposed by nonlinear periodic path modulator 506 in transmitter 500 is amplitude-modulated, nonlinear periodic path demodulator 520 removes the amplitude-modulated envelope by a similar, but opposite, method; the removed amplitude-modulated envelope has a frequency equal to nonlinear periodic path signal 536. A phase-lock loop circuit (not shown) can be used to synchronize the amplitude-modulated envelope removed by nonlinear periodic path demodulator 518 with the amplitude-modulated envelope added by nonlinear periodic path modulator 506. Any suitable phase-locked loop circuit may be used, such as a detector coupled to a regenerative oscillator (not shown). Information demodulator 522 receives signal 538 and produces signal 540 which is a reproduction of information signal 524.

The specific electronics used for the embodiment of the present invention illustrated in FIG. 15 can vary depending on transmission medium and the carrier frequency of EM wave 512. For example, transmission medium can be air, free space, a waveguide or an optical fiber. Where the carrier frequency of EM wave 512 is in the radio frequency spectrum, for example, transmission medium coupler 510 and transmission medium decoupler 516 can be antennas optimized for that particular carrier frequency. For example, an appropriate antenna can comprise monopole antennas, dipole antennas, helical antennas, and/or phased-array antenna, etc. Where the carrier frequency of EM wave 512, for example, is in the optical spectrum (e.g., infrared radiation or visible light), transmission medium coupler 510 and transmission medium decoupler 516 can be a fiber optic coupler and a beam splitter, respectively; carrier frequency source 504 can be a laser.

Note that the nonlinear periodic path followed by the E-field vector for EM waves used by embodiments of the present invention can be any suitable path and need not be limited to a rosette-shaped path as FIGS. 8A and 8B illustrate. Information channels can be established so long as the E-field vector traces a nonlinear periodic path at a frequency less than the carrier frequency of the EM wave. For example, in another embodiment of the present invention, the terminus of the E-field vector can follow an elliptical path. In other embodiments of the present invention, the path may be defined by a pseudorandom sequence generator. Essentially any nonlinear path that both a transmitter and receiver of a communications system can follow in synchronism at a frequency between the carrier frequency and zero would be suitable.

Figure 1:
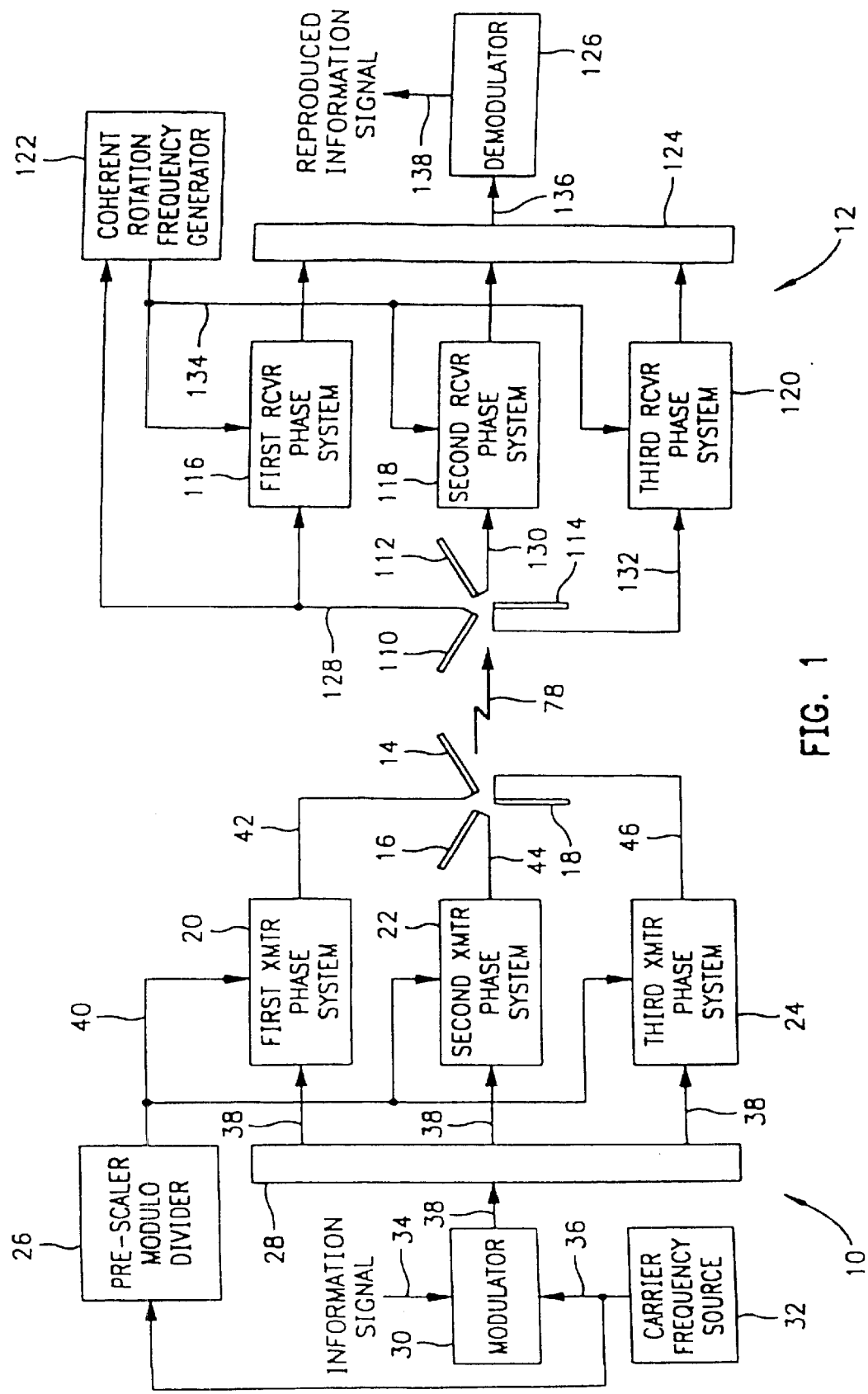
FIG. 1 is a block diagram of a communications system, including a transmitter and a receiver, according to an embodiment of the present invention.

FIG. 1 shows a communications system based on a single carrier signal according to another embodiment of the present invention. Note that the embodiment and its components described with respect to FIG. 1 are analogous to the embodiments described in FIG. 15. In other words, FIG. 1 and its corresponding discussion illustrate a possible implementation of the concepts discussed in reference to FIG. 15.

The communications system includes a transmitter 10 and a receiver 12 remotely located from one another. Transmitter 10 includes an antenna system having three antenna elements 14, 16 and 18, a first transmitter phase system 20 coupled to antenna element 14, a second transmitter phase system 22 coupled to antenna element 16, a third transmitter phase system 24 coupled to antenna element 18, a pre-scaler modulo divider 26, a signal splitter 28, a modulator 30, and a carrier frequency source 32.

Modulator 30 receives an information signal 34, which may be any suitable analog signal produced by any suitable source, such as a video signal or an audio signal, that is to be communicated to receiver 12 (or other suitable receiver). Although the illustrated embodiment is directed toward the communication of an analog information signal 34, in other embodiments of the invention the signal may be in digital format. In view of the teachings in this patent specification, both digital and analog communications systems can use the novel communication method.

Carrier frequency source 32 may include any suitable circuits or systems, such as a conventional sine-wave generator or oscillator, for providing a carrier frequency signal 36. As in any communications system, carrier frequency signal 36 should have a frequency that facilitates its modulation with information signal 34 for the given transmission medium, such as free space in wireless communication. For example, if information signal 34 is a conventional television signal, which under the NTSC standard in use in the United States has a six megahertz (MHz) bandwidth, carrier frequency signal 36 may be any of the existing television channels assigned by the appropriate national authorities for television transmission, which ranges in the United States from about 54 MHz to 890 MHz. For experimental purposes, the inventor selected 795.0 MHz, which is defined as channel 68 in the United States, as one channel of an experimental television communications system.

Using a television transmission system for illustrative purposes in this embodiment of the present invention, modulator 30 modulates carrier frequency signal 36 with the video signal represented by information signal 34. In accordance with a typical television modulation standard, such as that in use in the United States, the modulation is amplitude modulation (AM). Although television transmission is described in this embodiment for illustrative purposes, the present invention may be used to communicate any type of information in any suitable frequency band in accordance with any suitable modulation standard.

Signal splitter 28 provides the carrier signal 38 that has been modulated with information signal 34 to each of transmitter phase systems 20, 22 and 24. Each of transmitter phase systems 20, 22 and 24 also receives a transmitter rotation frequency signal 40 produced by pre-scaler modulo divider 26. Pre-scaler modulo divider 26 divides carrier frequency signal 36 down to produce transmitter rotation frequency signal 40. For reasons including facilitating synchronization of test equipment in the above-mentioned experimental communications system, the inventor selected a rotation frequency of 26.5 MHz or ⅓₀th of the carrier frequency to define a communication channel. Thus, pre-scaler modulo divider 26 may include a divide-by-30 circuit. It may comprise a divide-by-ten stage followed by a divide-by-three stage or any other suitable frequency dividing circuitry. Nevertheless, although the above-mentioned carrier frequency is an integer multiple of the above-mentioned rotation frequency, this relationship was selected at least partly to facilitate experimentation and is not required. Although not shown for purposes of clarity, other signal splitters may be included to more effectively distribute carrier frequency signal 36 to both modulator 30 and pre-scaler modulo divider 26 and to distribute transmitter rotation frequency signal 40 to phase systems 20, 22 and 24.

As described further below, each of phase systems 20, 22 and 24 has a different time-delay associated with it. Each of phase systems 20, 22 and 24 delays transmitter rotation frequency signal 40 by a different amount of time. The time-delay is selected in response to the wavelength of transmitter rotation frequency signal 40. In an alternative embodiment having N number of phase systems, each phase system delays transmitter rotation frequency signal by an amount equal to one Nth of its wavelength.

Any suitable rotation frequency between the carrier frequency and zero may be selected, but it should be greater than the highest frequency of the information signal. In the illustrated embodiment, transmitter rotation frequency signal 40 may have a frequency of, for example, 26.5 MHz, which corresponds to a wavelength of 11.3 meters (m) or a period of 37.7 nanoseconds (ns). Because there are three transmitter phase systems, first transmitter phase system 20 may delay transmitter rotation frequency signal 40 by zero seconds, second transmitter phase system 20 can delay transmitter rotation frequency signal 40 by one-third of 37.7 ns, and third transmitter phase system 20 can delay transmitter rotation frequency signal 40 by two-thirds of 37.7 ns. In generalized terms, transmitter phase system 20 delays the phase of transmitter rotation frequency signal 40 by zero degrees, transmitter phase system 22 delays the phase of transmitter rotation frequency signal 40 by 120 degrees, and transmitter phase system 24 delays the phase of transmitter rotation frequency signal 40 by 240 degrees.

Figure 3:
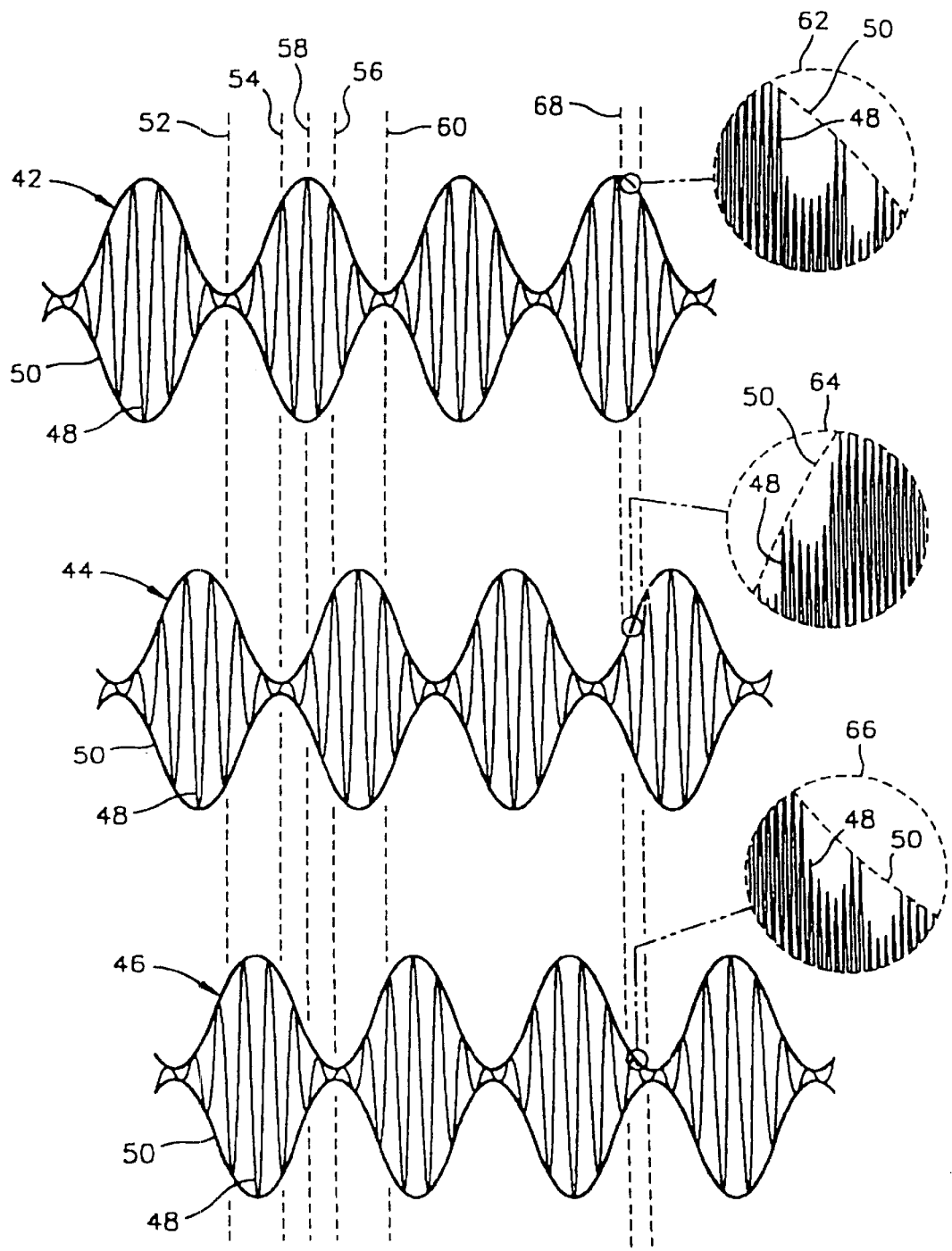
FIG. 3 illustrates signals amplitude-modulated with the rotation frequency signal, with a portion of each enlarged, according to an embodiment of the present invention.

Each of transmitter phase systems 20, 22 and 24 amplitude modulates carrier signal 38, which is itself already modulated with information signal 34, with the time-delayed transmitter rotation frequency signal 40. FIG. 3 illustrates the resulting amplitude-modulated carrier signals 42, 44 and 46 produced by transmitter phase systems 20, 22 and 24, respectively. (For purposes of clarity, FIG. 3 is not to scale, and therefore does not necessarily accurately reflect the relative sizes of the variations in the carrier frequency 48 with respect to the modulation envelope 50.) If the dashed line 52 is selected to represent a zero degree delay or phase shift, then dashed line 54 represents a 120 degree phase shift, and dashed line 56 represents a 240 degree phase shift. Dashed lines 58 and 60 represent 180 degrees (π radians) and 360 degrees (2π radians), respectively.

Note that the information carried upon any one of amplitude-modulated carrier signals 42, 44 and 46 is not delayed with respect to the information carried upon the other amplitude-modulated carrier signals. Rather, only the modulation envelope 50 of each amplitude-modulated carrier signal is delayed. The same information is carried by each of amplitude-modulated carrier signals 42, 44 and 46 at any instant in time. The enlargements 62, 64 and 66 illustrate this property. In an arbitrarily selected time interval 68, the same variations in carrier frequency 48 occur at the same point in time in each of amplitude-modulated carrier signals 42, 44 and 46.

Each of amplitude-modulated carrier signals 42, 44 and 46 is provided to a corresponding one of antenna elements 14, 16 and 18. Although described in further detail below, antenna elements 14, 16 and 18 can be dipole antennas (or, more specifically monopole antennas) being radially arrayed with respect to a center point at equal angular spacings from one another.

Figure 4:
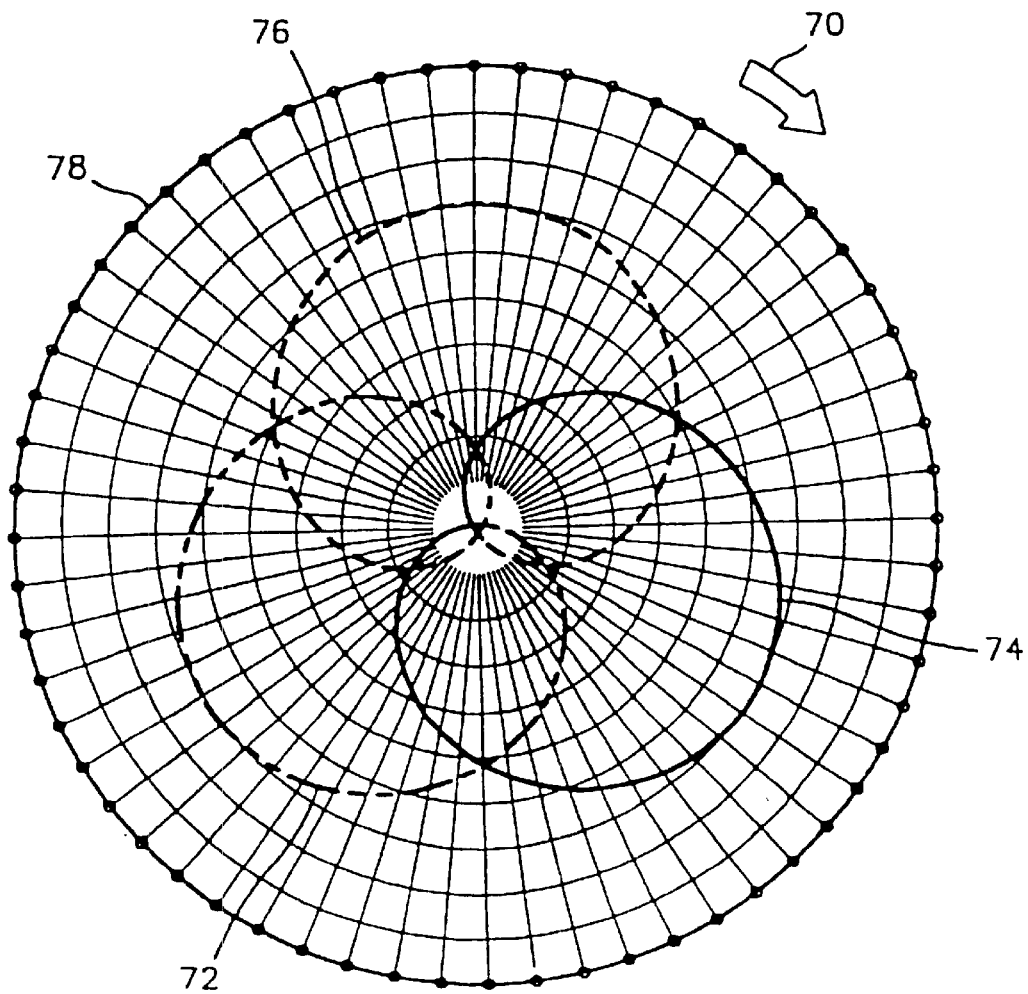
FIG. 4 is a polar plot of the amplitudes of the signals produced by the three antenna elements and their sum, according to an embodiment of the present invention.

As illustrated by the polar plot of FIG. 4, in which the axis of propagation is at the center of the plot and normal to the page, and in which time is represented by the angular direction of the arrow 70, each of antennas elements 14, 16 and 18 radiates a corresponding electromagnetic wave 72, 74 and 76. Each of waves 72, 74 and 76 has an amplitude that varies in a cardioid-like manner over time as a result of its excitation by one of amplitude-modulated carrier signals 42, 44 and 46, respectively. The transmitted wave 78 that is radiated by the transmitter antenna system is the resultant sum of waves 72, 74 and 76. For illustrative purposes in the plot of FIG. 4, the relative amplitudes of amplitude-modulated carrier signals 42, 44 and 46 are selected to result in a unit amplitude, i.e., a relative amplitude of one, for transmitted wave 78. The plot illustrates that, while the amplitude and direction of propagation of transmitted wave 78 remain constant, its electric (E) field vector rotates over time.

Returning to FIG. 7A, modulation envelope 94 is analogous to modulation envelope 50 in FIG. 3. Indeed, in the embodiment of the present invention described in FIG. 1, where three such E-field components are each 120 degrees out of phase, the resultant wave would have an E-field vector rotating about the propagation axis at a rotation frequency less than the carrier frequency and greater than zero similar to resultant E-field vector 96 shown in FIG. 7A.

Although FIGS. 7A–B and 8A–B are used for illustrative purposes to describe a wave having an E-field vector rotating at a rotation frequency between the carrier frequency and zero, the results shown in FIGS. 7A–B and 8A–B could be produced by an alternative embodiment in which the communication system included only two phase systems and two antenna elements. For example, two crossed dipoles, e.g., one horizontally aligned and the other vertically aligned, could be included in such an embodiment, although a 180 degree phase shift would need to be introduced into the rotation frequency signal. FIG. 8A illustrates the relative amplitudes of E-field components 90 and 92 and further illustrates the 180 degree phase shifts in such a crossed-dipole embodiment. Note the phase shifts at points 103, 105 and 107.

Figure 2:
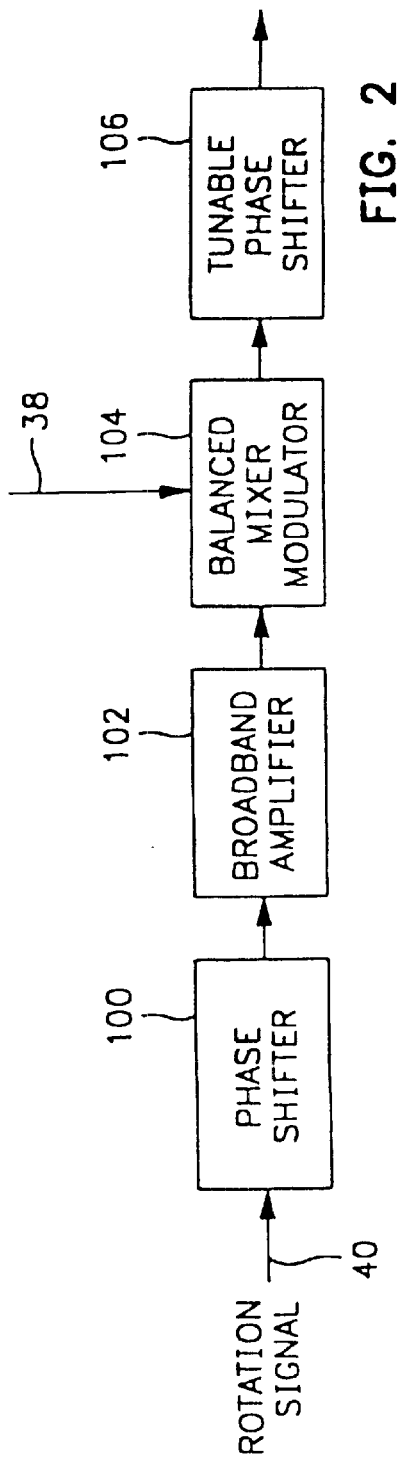
FIG. 2 is a block diagram of a transmitter phase system of the embodiment illustrated in FIG. 1.

As illustrated in FIG. 2, each of transmitter phase systems 20, 22 and 24 includes a phase shifter 100, a broadband amplifier 102, a balanced mixer modulator 104 and a tunable phase shifter 106. Phase shifter 100 should be selected to provide the time-delays or phase shifts described above with respect to transmitter phase systems 20, 22 and 24. Balanced mixer modulator 104 is a well-known type of circuit sometimes referred to in the art as a balanced mixer or balanced modulator, and can be of any suitable design. Tunable phase shifter 106 facilitates precisely tuning the total delays of the three transmitter phase systems 20, 22 and 24 in preparation for actual communications.

In alternative embodiments of the transmitter phase systems, the balanced mixer modulator can be replaced with, for example, a voltage variable attenuator which has a highly linear phase error over a wide bandwidth. The phase shifter can be replaced with a delay line or similar types of components which provide the time (or phase) delay described above. Furthermore, the transmitter phase system can include bandpass filters as appropriate and/or manual adjustable delay lines for making fine adjustments.

Returning to FIG. 1, receiver 12 is structurally similar to transmitter 10. Receiver 12 includes an antenna system having three antenna elements 110, 112 and 114, a first receiver phase system 116 coupled to antenna element 110, a second receiver phase system 118 coupled to antenna element 112, a third receiver phase system 120 coupled to antenna element 114, coherent rotation frequency generator 122, a signal combiner 124, and an information signal demodulator 126.

The receiver antenna system may be identical to the transmitter antenna system. Thus, in the embodiment shown in FIG. 1, antenna elements 110, 112 and 114 are dipoles (or, more specifically, monopoles) and radially arrayed with respect to a center point at, for example, equal angular spacings from one another. When transmitted wave 78 impinges upon the receiver antenna system, the amplitude of its components oriented along the polarization axis of each of antenna elements 110, 112 and 114 produce a corresponding signal 128, 130 or 132. The amplitudes of signals 128, 130 and 132 vary in accordance with the rotation of the E-field vector and thus in accordance with the amplitude modulation imposed by transmitter 10.

Figure 17:
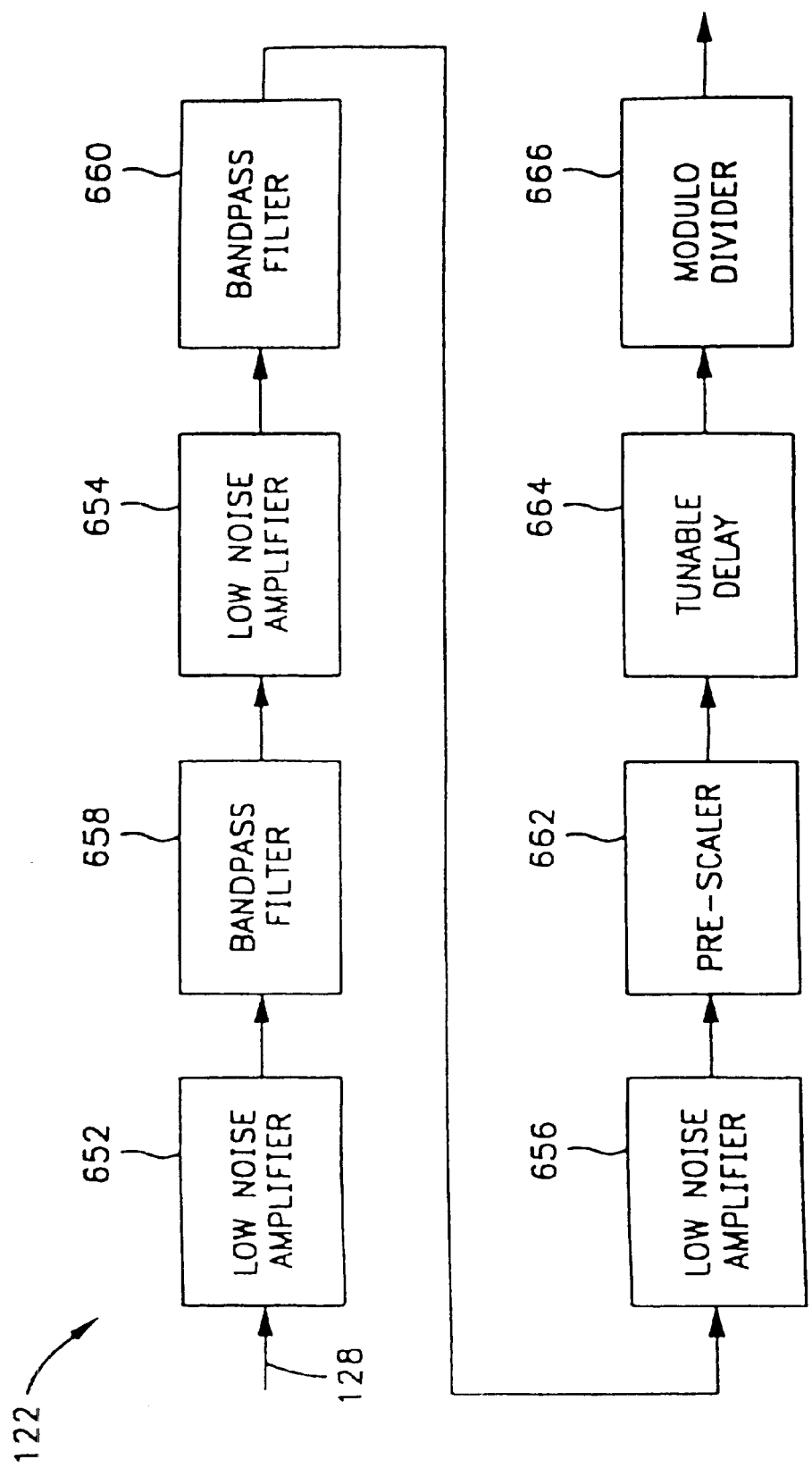
FIG. 17 is a block diagram of the coherent rotation frequency generator of the embodiment illustrated in FIG. 1.

Coherent rotation frequency generator 122 recovers the rotation frequency from one of the received amplitude-modulated signals, such as signal 128. As illustrated in FIG. 17, coherent rotation frequency generator 122 provides multi-stage amplification of the received signal to recover the carrier frequency. Although received signal 128 has a frequency component at the carrier frequency, this carrier frequency component is relatively attenuated. Thus, signal 128 is amplified in stages via three low-noise amplifiers 652, 654 and 656 and two bandpass filters 658 and 660 interposed between each two amplifiers. Bandpass filters 658 and 660 are centered at the carrier frequency, because in the illustrated embodiment the carrier frequency is an integer multiple of the rotation frequency. A pre-scaler 662 divides the frequency of the amplified signal to reproduce the rotation frequency from the carrier frequency; pre-scaler 662 can also provide further amplification. The pre-scaled signal is provided to a tunable delay 664. Tunable delay 664 can be manually adjusted to bring the rotation frequency signal into phase with the three received signals. In other words, tunable delay 664 can synchronize the phase between transmitter 10 and receiver 12 to establish coherency. A user may adjust delay 664 while observing the output of receiver 12, such as reproduced information signal 138, until the user can satisfactorily discern the received information. For example, if reproduced information signal 138 is a television signal, the user may monitor it visually on a video monitor or electronically on an oscilloscope while adjusting delay 664 to tune in the signal. The output of tunable delay 664 can be provided to a modulo frequency divider 666, which further divides the frequency down to the rotation frequency corresponding to the information channel to be received.

Although the division of the carrier frequency signal down to the rotation frequency signal is accomplished in this embodiment in two stages by means of pre-scaler 662 and modulo frequency divider 666, it should be noted that the frequency may be divided by means of fewer stages or more stages, depending on manufacturing, engineering or other design considerations. If the carrier frequency is, for example, 30 times the rotation frequency, dividing by means of a pre-scaler 662 that divides by ten followed by a modulo frequency divider 666 that further divides by three may be more economical than a single-stage that divides by 30 because divide-by-ten and divide-by-three circuits may be more readily available than divide-by-30 circuits.

In another embodiment, the coherent rotation frequency generator of the receiver can be replaced with a non-coherent rotation frequency generator using a phase locked loop (PLL) circuit (not shown). Any suitable phase locked loop circuit may be used, such as a phase locked loop detector coupled to a regenerative oscillator (not shown). In another embodiment, the transmitter and receiver rotation frequency sources used for terrestrial communication may use signals received from the global positioning satellite (GPS) system to synchronize their rotation frequencies.

Receiver phase systems 116, 118 and 120 delays receiver rotation frequency signal 134 in the same manner as transmitter phase systems 20, 22 and 24. Thus, first receiver phase system delays signal 134 by zero degrees, second receiver phase system delays signal 134 by 120 degrees, and third receiver phase system delays signal 134 by 240 degrees.

Each of receiver phase systems 116, 118 and 120 gates or detects amplitude-modulated signals 128, 130 and 132, respectively, in accordance with its corresponding time-delayed rotation frequency signal 134. By gating the signal in this manner, each receiver phase system sensitizes itself to only those amplitude-modulated signals that correspond in both frequency and phase to its corresponding time-delayed rotation frequency signal 134. When signal combiner 124 sums the gated outputs of receiver phase systems 116, 118 and 120, the resultant modulated carrier signal 136 is modulated only with the information; the modulation imposed by the rotation frequency sums to a constant value. If the gating in each of receiver phase systems 116, 118 and 120 matches that in each of transmitter phase systems 20, 22 and 24, the resultant modulated carrier signal 136 is a reproduction of modulated carrier signal 38 in transmitter 10. Demodulator 126 recovers the information signal from modulated carrier signal 136 in the conventional manner. For example, because the illustrated embodiment relates to conventional television carrier amplitude modulated with a video signal, demodulator 126 may be a conventional television tuner. The reproduced information signal 138 in receiver 12 is thus a reproduction of information signal 34 in transmitter 10.

Figure 5:
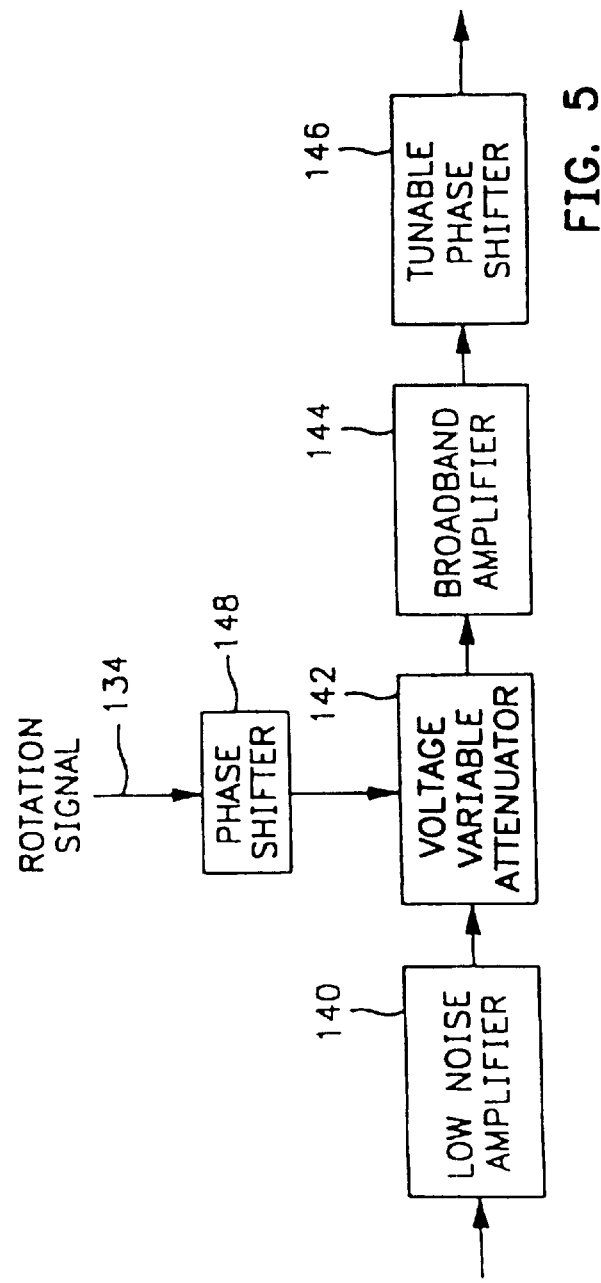
FIG. 5 is a block diagram of a receiver phase system of the embodiment illustrated in FIG. 1.

As illustrated in FIG. 5, each of receiver phase systems 116, 118 and 120 is constructed similarly to transmitter phase system 20, 22 and 24. Each includes a low-noise amplifier 140, a voltage variable attenuator 142, a broadband amplifier 144, a bandpass filter 146 and a phase shifter 148, all of which are readily commercially available. Phase shifter 148 is selected to provide the time delays or phase shifts described above with respect to receiver phase systems 116, 118 an 120. Tunable phase shifter 146 facilitates precise adjustment, as in transmitter phase systems 20, 22 and 24.

In alternative embodiments of the receiver phase systems, the voltage variable attenuator can be replaced with, for example, a balance mixer modulator. The phase shifter can be replaced with a delay line or similar types of components which provide the time (or phase) delay described above. Furthermore, the transmitter phase system can include bandpass filters as appropriate and/or manual adjustable delay lines for making fine adjustments.

Figure 9:
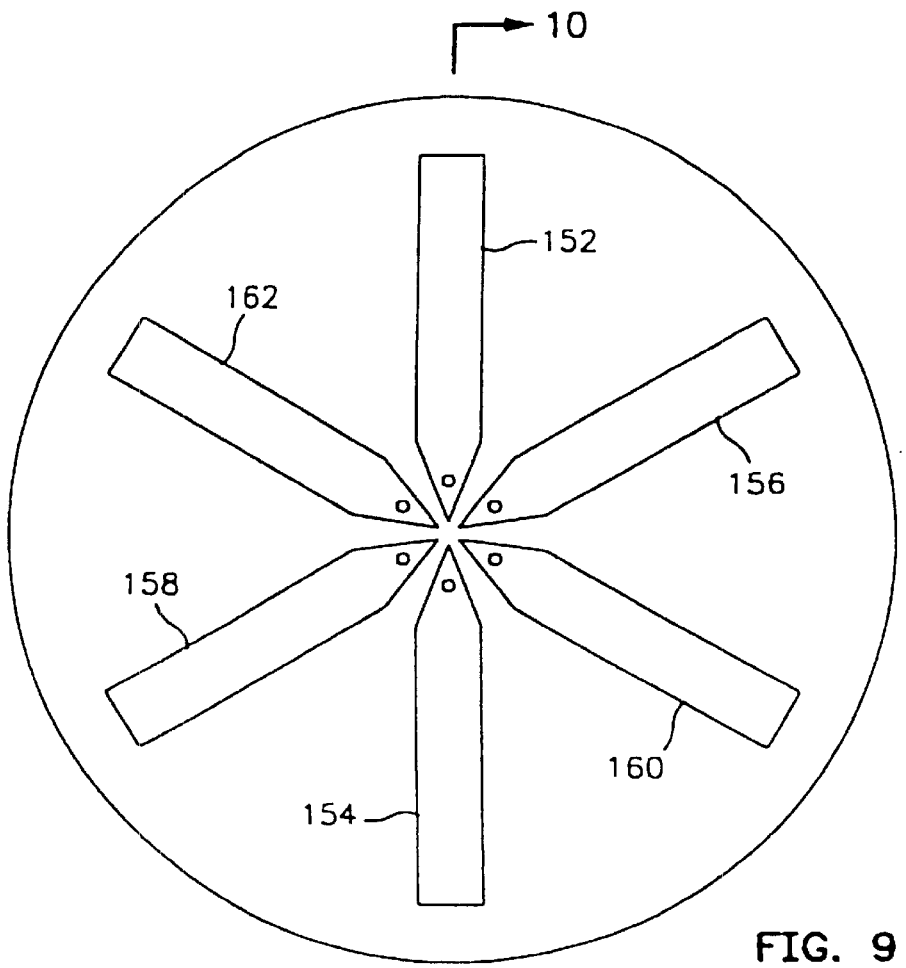
FIG. 9 is a top plan view of an antenna system of the embodiment illustrated in FIG. 1.
Figure 10:
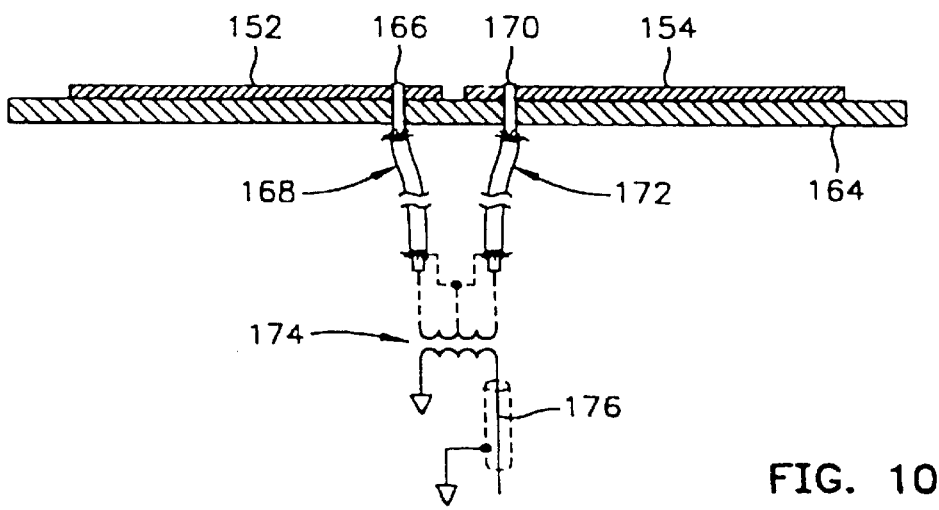
FIG. 10 is a sectional view taken on line 10—10 of FIG. 9.

As illustrated in FIGS. 9 and 10, a suitable antenna system that may be used in both transmitter 10 and receiver 12 comprises three half-wave dipoles (or, more specifically, monopoles) formed on a sheet of printed circuit board using a conventional etching process. The first dipole includes elements 152 and 154. The second dipole includes elements 156 and 158. The third dipole includes elements 160 and 162. Elements 152–162 are defined by the areas of copper remaining on the board substrate 164 following the etching process. The center conductor 166 of a first length of coaxial cable 168 is fed through a hole in the printed circuit board and soldered to one element of one of the dipoles. The center conductor 170 of a second length of coaxial cable 172 is fed through a hole in the printed circuit board and soldered to the other element of that dipole. A balanced-to-unbalanced transformer or balun 174 is used to match the dipole to the feed 176, which can be a length of coaxial cable having a grounded shield. The shields of both lengths of coaxial cable 168 and 172 are coupled to the center tap of balun 174. When used as the antenna system for transmitter 10, each dipole corresponds to one of antenna elements 14, 16 and 18, and feed 176 receives the corresponding one of signals 42, 44 and 46. When used as the antenna system for receiver 12, each dipole corresponds to one of antenna elements 110, 112 and 114, and feed 176 receives the corresponding one of signals 128, 130 and 132.

Figure 18:
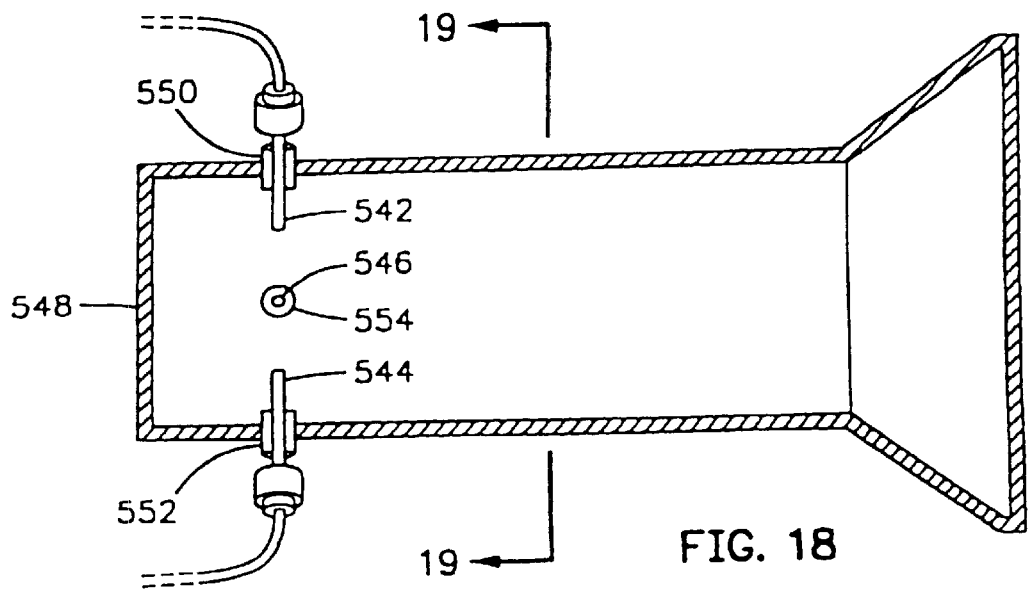
FIG. 18 is sectional view of an alternative antenna system of the embodiment illustrated in FIG. 1.
Figure 19:
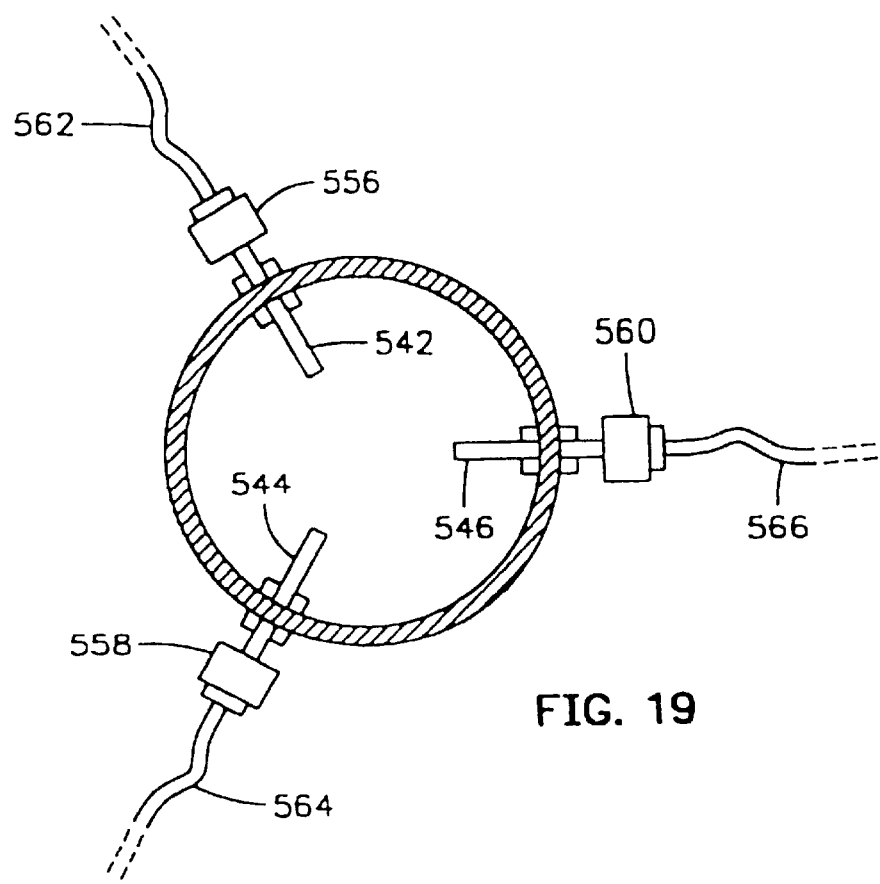
FIG. 19 is a sectional view taken on line 19—19 of FIG. 18.

As illustrated in FIGS. 18 and 19, another suitable antenna system that can be used in both transmitter 10 and receiver 12 comprises three monopole elements 542, 544 and 546 mounted, for example, 120 degrees apart in a cylindrical waveguide 548 with their axes radially oriented with respect to the longitudinal axis of waveguide 548. Elements 542, 544 and 546 can be mounted through the wall of waveguide 548 in insulating sleeves 550, 552 and 554, respectively, or in any other suitable manner. Waveguide 548 can have a suitable horn at its distal end to concentrate the transmitted or received wave. Coaxial cable connectors 556, 558 and 560 couple elements 542, 544 and 546, respectively, to coaxial cables 562, 564 and 566.

This embodiment of the antenna system advantageously eliminates higher order modes of EM waves that would otherwise be propagated and consequently reduce the extent to which the emitted waves superpose in the intended manner. As discussed in detail above, the waves emitted from the individual antenna elements, considered individually in certain embodiments of the invention to be planar-polarized, superpose in the nearfield to produce a wave having a rotating E field. The antenna system illustrated in FIGS. 18 and 19 reduces or eliminates the extent to which emitted waves incompletely superpose in the intended manner.

The antenna can be constructed in a manner similar to a conventional cylindrical waveguide having a radially mounted element. For example, waveguide 548 and elements 542, 544 and 546 can be made of any suitable conductor, such as copper, aluminum or brass. Also, waveguide 548 may have a length greater than or equal to one wavelength of the carrier frequency. The dimensions of waveguide 548 and the longitudinal location of elements 542, 544 and 546 are selected to eliminate modes higher than the fundamental mode of the cylindrical waveguide (i.e., the TE11 mode). Suitable dimensions that achieve single mode propagation can be computed using well-known antenna engineering formulas in response to the selected carrier frequency. For the exemplary carrier frequency mentioned above of 795.0 MHz, such calculations may indicate a diameter of about 23.8 cm (9.4 inches).

In summary, with respect to, for example, FIG. 1, an embodiment of the communications system of the present invention can be characterized as receiver 12 synchronously following the rotating E-field vector of the signal emitted by transmitter Moreover, al though the above-illustrated embodiment can be directed toward radio frequency communication through free space, the invention is not limited to that transmission medium. In other embodiments, for example, the invention may communicate signals through waveguide or optical fiber. Thus, although the illustrated embodiments include a transmitter antenna system for radiating or launching radio frequency electromagnetic waves through free space, other embodiments that communicate electromagnetic waves through other media may include radiators suited for launching electromagnetic waves through those media, such as optical radiators for launching light waves through fiber media. Similarly, although the illustrated embodiments include a receiver antenna system for receiving the radio frequency electromagnetic waves through free space, other embodiments that communicate electromagnetic waves through other media may include receptors suited for receiving electromagnetic waves through those media, such as optical receptors for fiber media.

Figure 13:
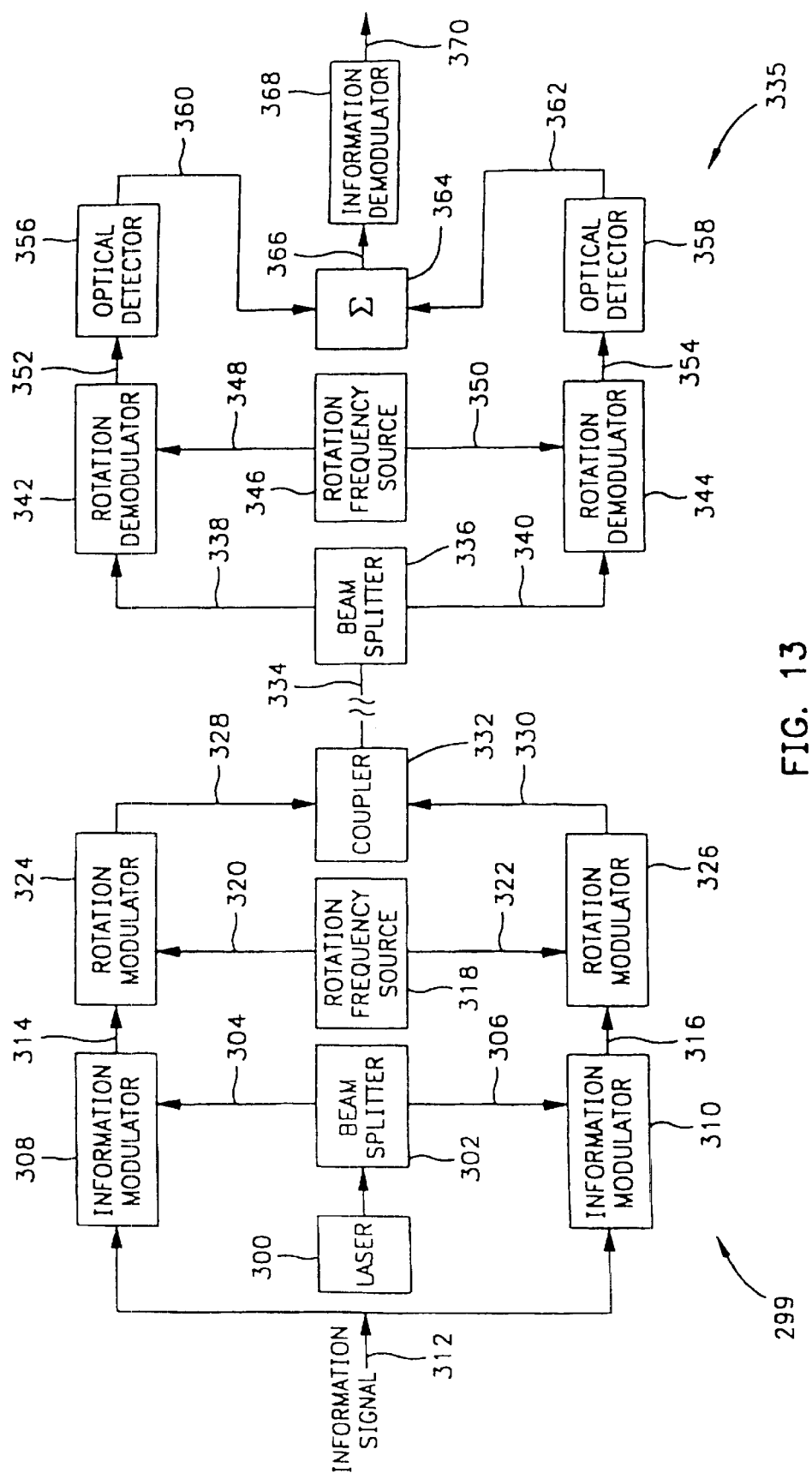
FIG. 13 is a block diagram of a communications system including an optical transmitter and receiver, according to an embodiment of the present invention.

FIG. 13 illustrates an optical communications system using a single carrier signal according to another embodiment of the present invention. In transmitter 299, laser 300 generates a wave having a carrier frequency that passes through beam splitter 302 to generate two waves 304 and 306 having the carrier frequency. Waves 304 and 306 can be linear polarized waves as are commonly generated by conventional lasers. Two information modulators 308 and 310 modulate waves 304 and 306 based on information signal 312 to produce information-modulated waves 314 and 316, respectively.

Rotation frequency source 318 provides rotation signals 320 and 322, both having a rotation frequency between the carrier frequency and zero, to optical rotation modulators 324 and 326; rotation signals 320 and 322 can be amplitude modulated and phase delayed with respect to one another by optical rotation modulators 324 and 326 in a manner similar to that of the rotation signals described above with respect to FIG. 1. For example, one of optical rotation modulators 324 and 326 can include a half-wave phase plate to phase delay one of the information-modulated waves 314 and 316 when waves 314 and 316 are linearly polarized. Optical rotation modulators 324 and 326 modulate the information-modulated optical waves 314 and 316, respectively, at the rotation frequency based on rotation signals 320 and 322, respectively, to produce optical waves 328 and 330.

Coupler 332 combines and transmits the optical waves 328 and 330 through optical fiber 334. The combination of optical waves 328 and 330 has a resultant E-field vector rotating about the propagation axis at a rotation frequency which is between the carrier frequency and zero.

At the receiver 335 connected to optical fiber 334, beam splitter 336 divides the received wave into optical waves 338 and 340. Rotation demodulators 342 and 344 receive optical waves 338 and 340, respectively. Rotation frequency source 346 similar to rotation frequency source 318 provides the rotation signals 348 and 350 to demodulators 342 and 344, respectively. Rotation demodulators 342 and 344 produce demodulated optical waves 352 and 354 based on rotation signals 348 and 350. Optical detectors 356 and 358 convert demodulated optical waves 352 and 354 to electronic signals 360 and 362, respectively. Summer 364 combines electronic signals 360 and 362 to produce electronic signal 366. Information demodulator 368 receives electronic signal 366 to produce information signal 370 which is a reproduction of information signal 312.

Laser 300 can be selected to be optimized for propagation in optical fiber 334. For example, laser 300 can be an aluminum gallium arsenide (AlGaAs) or an indium gallium arsenide (InGaAs) multi-layered, distributed feedback (DFB) laser emitting in the wavelength range 1.3 to 1.55 $\mu$m. Optical detectors 356 and 362 can be selected to be spectrally responsive to laser 300. For example, optical detectors 356 and 362 can be back-biased gallium arsenide (GaAs) diode detectors.

Information modulators 308 and 310, rotation modulators 324 and 325, and rotation demodulators 342 and 344 can be variously configured to modulate the phase and/or amplitude of the optical wave as is appropriate. For example, the modulators and demodulators can be a lithium niobate (LiNbO$_3$) electro-optic modulators, such as Pockel cells.

Multiple Channels Using a Single Carrier Signal

In another embodiment of the present invention, multiple transmitter-receiver systems can communicate over selected information channels, each channel being defined by a selected constant E-field angular velocity different from that of all other such channels.

Figure 11:
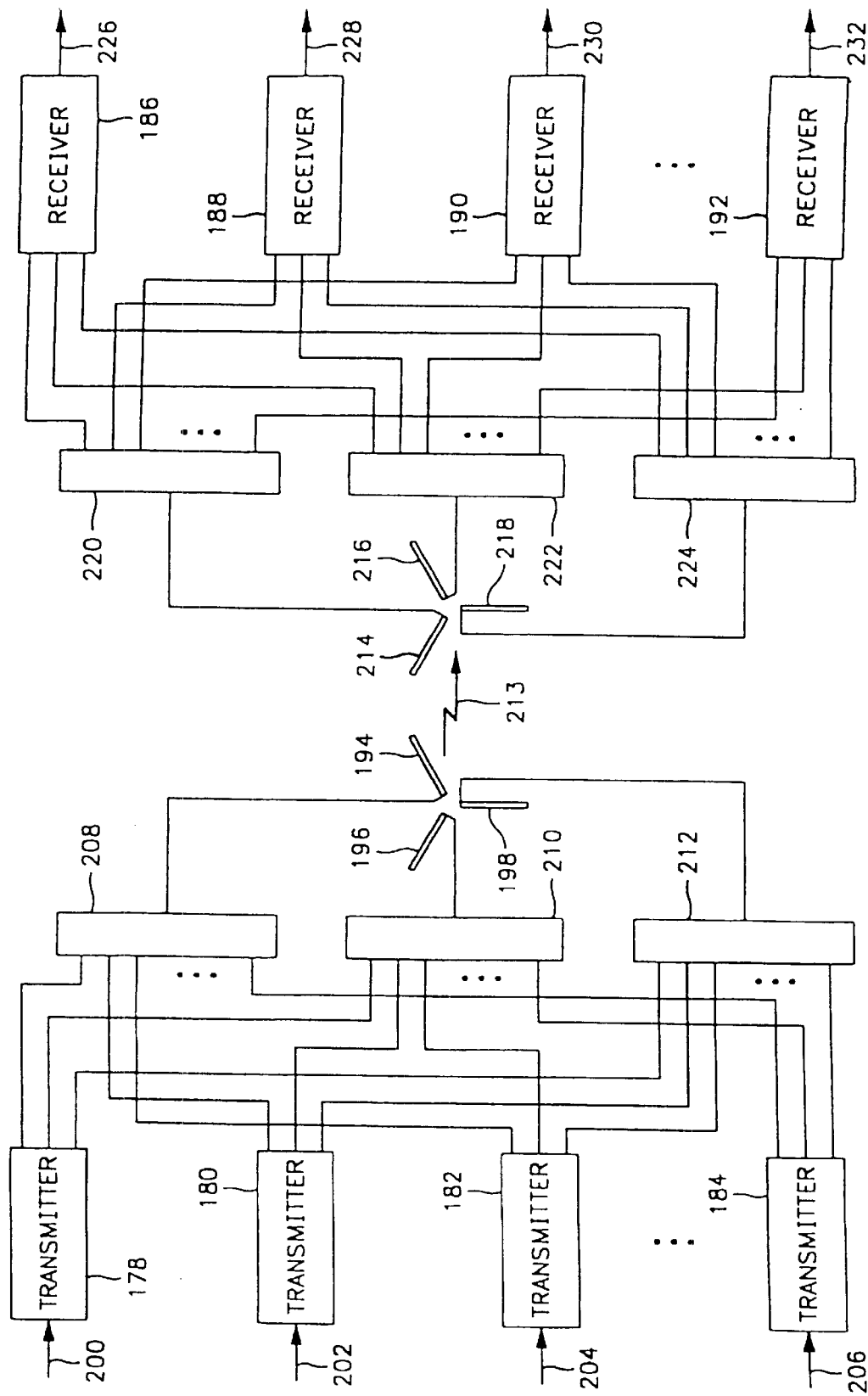
FIG. 11 is a block diagram of a communications system including multiple transmitters and receivers operating simultaneously (i.e., concurrently), according to an embodiment of the present invention.

FIG. 11 illustrates a communications system having multiple transmitter-receiver systems that can communicate over selected information channels. Transmitters 178, 180, 182 and 184 communicate simultaneously (i.e., concurrently) with receivers 186, 188, 190 and 192. (The ellipses (". . . ") between transmitters 182 and 184 and between receivers 190 and 192 represent other transmitters and receivers, respectively, because any suitable number of transmitters and receivers may communicate simultaneously (i.e., concurrently); the total number of transmitters or receivers would be N.)

Each of transmitters 178, 180, 182 and 184 consists of the electronics of transmitter 10 described above with respect to FIG. 1 or the electro-optical components of transmitter 299 described above with respect to FIG. 13. Transmitters 178, 180, 182 and 184 can share a common antenna system. For example, when transmitters 178, 180, 182 and 184 consist of electronics of transmitter 10, the antenna system can be a three-element antenna comprising elements 194, 196 and 198.

Each of transmitters 178, 180, 182 and 184 receives an information signal 200, 202, 204 and 206, respectively. Information signals 200, 202, 204 and 206 are modulated with the carrier signal by having a modulator (not shown) within each transmitter 178, 180, 192 and 184 where the carrier signals are phase locked by a phase-lock circuit (not shown). In response to information signals 200, 202, 204 and 206, each of transmitters 178, 180, 182 and 184 produces three amplitude-modulated carrier signals (for the embodiments having a three-element antenna system), such as for example, signals 42, 44 and 46 described above with respect to FIG. 1. The amplitude-modulated carrier signals carry amplitude-modulation at a rotation frequency different from that carried by the amplitude-modulated carrier signals produced by all of the others of transmitters 178, 180, 182 and 184. In other words, each of transmitters 178, 180, 182 and 184 operates at a different selected rotation frequency that uniquely defines a communication channel.

As described above with respect to FIG. 1 and for the example of a three-element antenna system, each amplitude-modulated signal produced by a transmitter, such as transmitter 10 in FIG. 1, is associated with one of three time-delays. A first combiner 208 combines the amplitude-modulated signal produced by each of transmitters 178, 180, 182 and 184 that is associated with the first time-delay. A second combiner combines the amplitude-modulate signal produced by each of transmitters 178, 180, 182 and 184 that is associated with the second time-delay. A third combiner 212 combines the amplitude-modulate signal produced by each of transmitters 178, 180, 182 and 184 that is associated with the third time-delay. Antenna element 194 receives the output of first combiner 208. Antenna element 196 receives the output of second combiner 210. Antenna element 198 receives the output of third combiner 212. The transmitter antenna system transmits a signal 213 representing multiple combined communication channels in the same manner as described above with respect to the single-channel system illustrated in FIG. 1.

Each of receivers 186, 188, 190 and 192 consists of the electronics of receiver 12 described above with respect to FIG. 1 or the electro-optical components of receiver 335 described above with respect to FIG. 13. Receivers 186, 188, 190 and 192 can share a common antenna system that comprises elements 214, 216 and 218 for the example of a three-element antenna at the receivers. The receiver antenna system receives multiple communication channels. A first splitter 220 splits the amplitude-modulated signal received by antenna element 214 into multiple amplitude-modulated signals associated with the first time-delay. A second splitter 222 splits the amplitude-modulated signal received by antenna element 216 into multiple amplitude-modulated signals associated with the second time-delay. A third splitter 224 splits the amplitude-modulated signal received by antenna element 218 into multiple amplitude-modulated signals associated with the third time-delay. A phase-lock loop (PLL) circuit (not shown) locks the phase of the signals used to demodulate the amplitude-modulated signals received by antenna elements 214, 216 and 218. Each of receivers 186, 188, 190 and 192 operates at a different selected rotation frequency that uniquely defines one of the communication channels. Receivers 186, 188, 190 and 192 generate the reproduced information signals 226, 228, 230 and 232 in response to the amplitude-modulated signals provided by each of splitters 220, 222 and 224 in the same manner described above with respect to FIG. 1 in which receiver 12 generates reproduced information signal 138.

The rotation frequency provides channel selectivity that is additional to that provided by the frequency of the carrier signal. Thus, one of receivers 186, 188, 190 and 192 tuned to a selected channel, i.e., operating at a certain rotation frequency, receives substantially less interference from the communication signals produced by transmitters 178, 180, 182 and 184 operating on other channels, i.e., at other rotation frequencies. Transmitters 178, 180, 182 and 184 and receivers 186, 188, 190 and 192 can all operate simultaneously (i.e., concurrently) at the same carrier signal frequency, yet only one of receivers 186, 188, 190 and 192 communicates with each of transmitters 178, 180, 182 and 184, respectively, because the rotation frequency rather than the carrier frequency provides the channel selectivity.

A communications system having multiple transmitters sharing a common transmitter antenna system and multiple receivers sharing a common receiver antenna system, as illustrated in FIG. 11, is economical because it minimizes the number of antenna elements. Nevertheless, a communications system in which each transmitter includes its own antenna system would operate in an equivalent manner. For example, a system may include multiple transmitters and receivers such as transmitter 10 and receiver 12 in FIG. 1 and may simultaneously (i.e., concurrently) communicate via a corresponding multiplicity of channels. Each transmitter 10 operating at a given carrier frequency and at a rotation frequency different from that of all other transmitters 10 defines a unique communication channel. All of the transmitters 10 and receivers 12 of such a system may operate simultaneously (i.e., concurrently) at the same carrier signal frequency, yet only one of the receivers 12 communicates with each of the transmitters 10.

In disclosed embodiments of the present invention using a single carrier signal, channels should be allocated an appropriate bandwidth in the domain of the rotation frequency to transmit the information effectively. In other words, the rotation frequency of each channel for a given carrier frequency should be sufficiently offset from the rotation frequencies of adjacent channels having the same (or close to the same) carrier frequency so that the channels do not overlap. For example, an information signal having a 6 MHz bandwidth can be represented by a signal in the rotation frequency domain having a 6 MHz bandwidth. Each nonlinear path frequency source defining a different channel should be selected to separate the corresponding signals in the rotation frequency domain from one another to avoid overlapping.

In general, the EM wave (e.g., EM wave 78 in FIG. 1 or EM wave 512 in FIG. 15) can have its E-field vector rotating about the propagation axis at a rotation frequency less than the carrier frequency and greater than zero. More specifically, however, the rotation frequency should be selected to be sufficiently less than the carrier frequency and greater than zero to enable detection by the receiver without at least a portion of the information being unrecoverable. A portion of the information may otherwise be unrecoverable when the rotation frequency is selected such that the frequencies of certain information frequency components exceed the carrier frequency or fall below zero.

When certain frequency components of the information exceed, for example, the carrier frequency, those frequency components of the information will be detected by the receiver as inverted at rotation frequencies less than the carrier frequency; these inverted rotation frequency components will cancel the non-inverted rotation frequency components thereby causing a portion of the information to be unrecoverable. For example, a rotation frequency component exceeding the carrier frequency by 10 MHz will be inverted and canceled with the rotation frequency component at the carrier frequency minus 10 MHz by the receiver.

The frequency components of the information correspond to the bandwidth of the information and the manner in which the information is carried on the EM wave. The information can be carried on the EM wave (e.g., EM wave 78 in FIG. 1 or EM wave 512 in FIG. 15) in either the frequency domain and/or the rotation domain. In other words, the information can be carried upon the EM wave by modulating the carrier frequency signal (e.g., using amplitude modulation, frequency modulation or phase modulation) and/or by modulating the rotation frequency signal (e.g, using frequency modulation or phase modulation).

For example, where the information is only amplitude modulated on to the carrier frequency signal, the frequency bandwidth of the EM wave approximately equals the bandwidth of the information. In this case, the rotation frequency of the EM wave should be less than the carrier frequency by one-half of the information bandwidth and greater than zero by one-half of the information bandwidth. For example, where the information bandwidth is 6 MHz, the lowest possible rotation frequency should be greater than one half of the bandwidth to provide sufficient room above zero for the channel (e.g., 3 MHz for a 6 MHz bandwidth information signal), and the highest possible rotation frequency should be at least one half of the bandwidth below the carrier frequency (e.g., 3 MHz for a 6 MHz bandwidth information signal).

Communications Systems Based on two Carrier Signals

Figure 16:
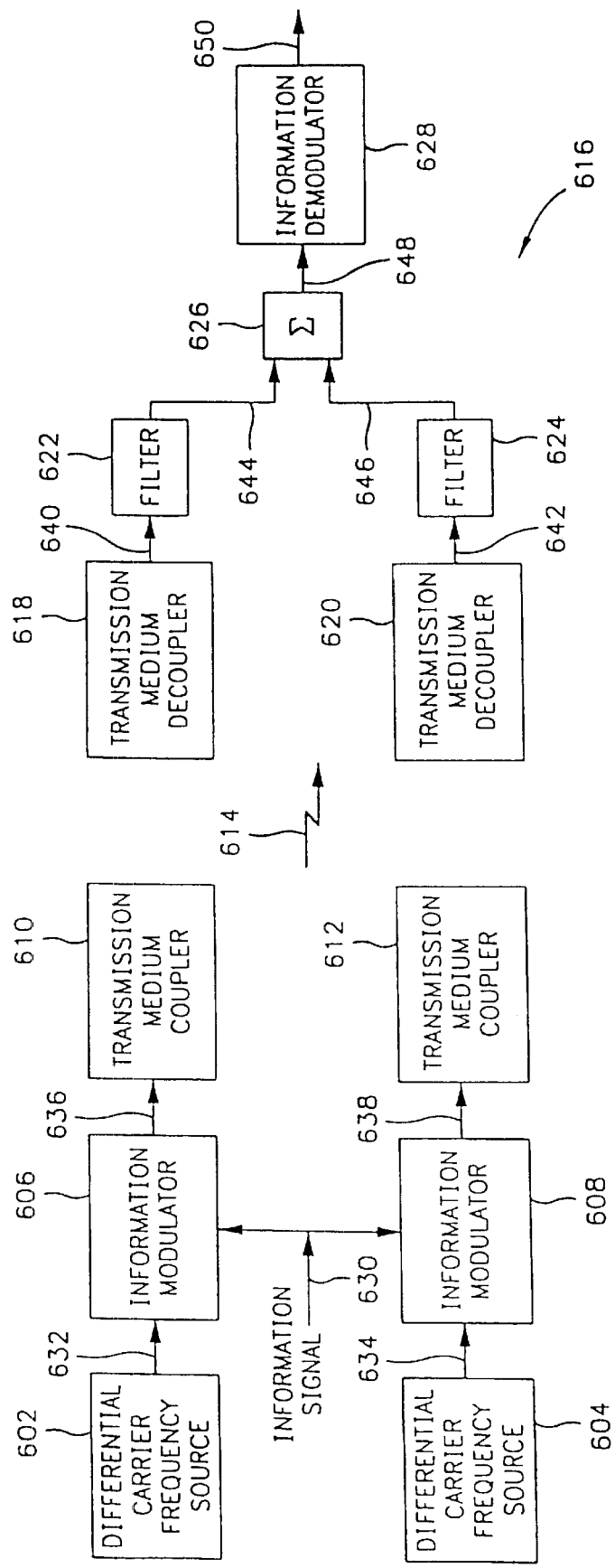
FIG. 16 is a block diagram of a communications system using two different carrier signals according to an embodiment of the present invention.

FIG. 16 is a block diagram of a communications system using two different carrier signals according to an embodiment of the present invention. In FIG. 16, a transmitter 600 includes two differential carrier frequency sources 602 and 604, two information modulators 606 and 608, and two transmission medium couplers 610 and 612. Transmitter 600 sends EM wave 614 through a transmission medium (not shown) to receiver 616. Receiver 616 includes two transmission medium decouplers 618 and 620, two filters 622 and 624, summer 626 and information demodulator 628.

Information modulator 606 receives information signal 630 and upper differential carrier frequency signal 632 from differential carrier frequency source 602 to produce signal 636. Similarly, information modulator 608 receives information signal 630 and lower differential carrier frequency signal 634 from differential carrier frequency source 604 to produce signal 638. Information signal 630 can be any suitable analog signal produced by any suitable source, such as a video signal or an audio signal, that is to be communicated to receiver 616 (or other suitable receiver). Similarly, information signal 630 can be in digital format.

Differential carrier frequency sources 602 and 604 can include any suitable circuits or systems, such as a conventional sine-wave generator or oscillator, for providing carrier signals 632 and 634, respectively. Carrier signals 632 and 634 should have a frequency that facilitates their modulation with information signal 630 for the given transmission medium.

Transmission medium coupler 610 and 612 receives signals 636 and 638, respectively, to produce two EM waves the superposition of which is EM wave 614. The EM wave sent by transmission medium coupler 610 has an E-field vector terminus that traces a nonlinear periodic path. The EM wave sent by transmission medium coupler 612 has an E-field vector terminus that traces the same nonlinear periodic path but in the opposite direction. For example, coupler 610 can send an EM wave that is left-hand circularly polarized at one carrier frequency; coupler 612 can send an EM wave that is right-hand circularly polarized at another carrier frequency.

Receiver 616 receives EM wave 614 at transmission medium decouplers 618 and 620. Transmission medium decoupler 618 receives EM wave 614 to produce signal 640 which corresponds to the EM wave sent by transmission medium coupler 610; transmission medium decoupler 620 receives EM wave 614 to produce signal 642 which corresponds to the EM wave sent by transmission medium coupler 612.

Filters 622 and 624 receive signals 640 and 642, respectively, and produce signals 644 and 646, respectively. Filters 622 and 624 can be notch filters and impedance matching circuits that prevent cross-coupling of the signals. Filters 622 and 624 can have a spectral bandwidth appropriate for signals 640 and 642, respectively, centered about the carrier frequencies of differential carrier frequency sources 602 and 604, respectively.

Summer 626 sums signals 644 and 646 to produce signal 648. Signal 648 contains information at a new carrier frequency being the average of the upper differential carrier frequency and the lower differential carrier frequency; information is no longer present at the upper and lower differential carrier frequencies. In other words, an information channel exists in a manner analogous to the communications systems based on a single carrier signal discussed above, where the information is carried at a new carrier frequency that is the average of the upper and lower differential carrier frequencies, and the E-field vector traces a nonlinear periodic path at a frequency equal to one-half of the difference of the upper and lower differential carrier frequencies. The E-field vector can trace a nonlinear periodic path about the propagation axis at any suitable frequency between the new carrier frequency and zero, but the frequency of the path traversed about the propagation axis should be greater than the highest frequency of the information signal.

The transmission medium coupler driven by the differential carrier signal having the higher of the two differential carrier frequencies dictates the direction in which the E-field vector traces the nonlinear periodic path. For example, in an embodiment in which transmission medium coupler 610 emits an EM wave having an E-field vector rotating about the propagation axis in a clockwise direction, and transmission medium coupler 612 emits an EM wave having an E-field vector rotating about the propagation axis in a counterclockwise direction, the E-field vector of resulting EM wave 614 rotates about the propagation axis in a clockwise direction if differential carrier frequency source 602 produces a higher frequency than differential carrier frequency source 604, and rotates about the propagation axis in a counterclockwise direction if differential carrier frequency source 604 produces a higher frequency than differential carrier frequency source 602.

Information demodulator 628 receives signal 648 and produces signal 650 which is a reproduction of information signal 630. Information demodulator 628 demodulates signal 648 based on the new carrier frequency being the average of the upper and lower differential carrier frequencies. Information demodulator 628 can be, for example, a conventional AM receiver.

The specific electronics used for the embodiment of the present invention illustrated in FIG. 16 can vary depending on transmission medium and the carrier frequencies of EM wave 614. For example, transmission medium can be free space, a waveguide or a optical fiber. Where the carrier frequencies of EM wave 614 is in the radio frequency spectrum, for example, transmission medium couplers 610 and 612, and transmission medium decouplers 618 and 620 can be antennas optimized for those carrier frequencies. For example, an appropriate antenna can comprise monopole antennas, dipole antennas, helical antennas, and/or phased-array antenna, etc. Where the carrier frequencies of EM wave 614 is in the optical spectrum (e.g., infrared radiation or visible light), for example, transmission medium couplers 610 and 612 can be fiber optic couplers; transmission medium coupler 618 and 620 and summer 626 can be an optical detector; and differential carrier frequency sources 602 and 604 can be lasers each producing a wave having an E-field vector rotating in opposite directions.

Figure 12:
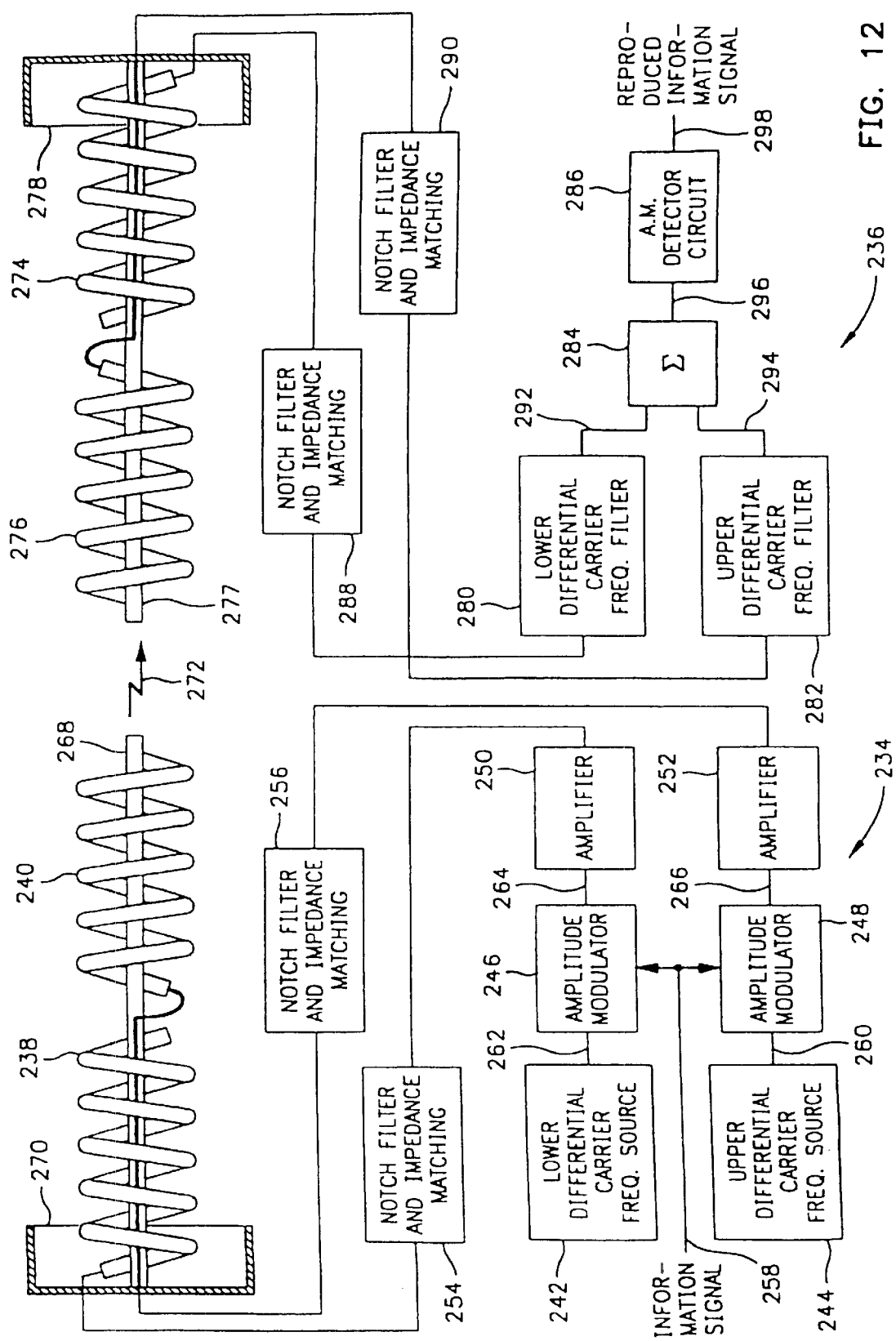
FIG. 12 is a block diagram of a communications system including a transmitter and receiver, according to another embodiment of the present invention.

FIG. 12 shows a communications system based on two different carrier signals according to another embodiment of the present invention. The communications system includes a transmitter 234 and a receiver 236. Transmitter 234 includes a dual helical antenna system comprising two helical antenna elements 238 and 240. Transmitter 234 further includes transmitter electronics comprising a lower differential carrier frequency source 242, an upper differential carrier frequency source 244, two amplitude modulators 246 and 248, two amplifiers 250 and 252, and two notch filter and impedance matching circuits 254 and 256.

Modulators 246 and 248 each receive an information signal 258, which may be, for example, any suitable analog signal produced by any suitable source, such as a video signal or an audio signal, that it is desired to communicate to receiver 236 (or other suitable receiver). Thus, the source may be, for example, that of a conventional NTSC television channel having a 6 MHz bandwidth. Upper differential carrier frequency source 244 produces an upper differential signal 260 having an upper differential carrier frequency that is equal to the predetermined carrier frequency plus the predetermined rotation frequency. Lower differential carrier frequency source 242 produces a lower differential signal 262 having a lower differential carrier frequency that is equal to the predetermined carrier frequency minus the predetermined rotation frequency. Frequency sources 242 and 244 may include any suitable circuits or systems, such as a conventional sine-wave generator or oscillator.

The modulated lower differential signal 264 is coupled to antenna element 238 via amplifier 250. The modulated upper differential signal 266 is coupled to antenna element 240 via amplifier 252. Amplifiers 250 and 252 should have a bandwidth of at least 6 MHz if information signal 258 is a conventional NTSC television signal. Helical antenna elements 238 and 240 can have opposite twists and can be disposed generally coaxially along a central supporting structure 268. For example, antenna element 238 may have a right-hand twist, and antenna element 240 may have a left-hand twist. Thus, antenna element 238 radiates a right-hand circularly polarized wave, and antenna element 240 radiates a left-hand circularly polarized wave. A reflector 270 (shown in cross-section in FIG. 12 for clarity) is disposed at the proximal end of the antenna system.

Resultant transmitted electromagnetic wave 272 radiated by the antenna system has similar characteristics as transmitted signal 78 described above with respect to the embodiment illustrated in FIG. 1. In other words, resultant transmitted wave 272 has an E-field vector rotating about the propagation axis at a frequency less than the average of the upper differential carrier frequency and the lower differential carrier frequency. In an embodiment in which helical antenna element 240 emits an EM wave having an E-field vector rotating about the propagation axis in a clockwise direction, and helical antenna element 238 emits an EM wave having an E-field vector rotating about the propagation axis in a counterclockwise direction, the E-field vector of wave 272 rotates about the propagation axis in a clockwise direction because upper differential carrier frequency source 244 produces a higher frequency than lower differential carrier frequency source 242. In an embodiment in which helical antenna element 240 emits an EM wave having an E-field vector rotating about the propagation axis in a counterclockwise direction, and helical antenna element 238 emits an EM wave having an E-field vector rotating about the propagation axis in a clockwise direction, the E-field vector of wave 272 rotates about the propagation axis in a counterclockwise direction because upper differential carrier frequency source 244 produces a higher frequency than lower differential carrier frequency source 242.

Notch filter and impedance matching circuits 254 and 256 prevent cross-coupling of the signals. Circuit 254 has a 6 MHz notch centered at the frequency of the upper differential carrier frequency and thus passes only signals around the lower differential carrier frequency. Similarly, circuit 256 has a 6 MHz notch centered at the frequency of the lower differential carrier frequency and thus passes only signals around the upper differential carrier frequency. Circuits 254 and 256 can also include suitable impedance-matching circuits, such as baluns.

The operation of transmitter 234 may be understood by comparing the communications system based on two different carrier signals with the communications system based on a single carrier signal. In the system based on a single carrier signal, the E-field vector of the propagating resultant wave is rotating; the resultant wave produces no sidebands although sidebands would be present if only one component of the wave produced by a given antenna element were considered. Sidebands are eliminated in the resultant wave due to the superposition of the radiated wave components from the other antenna elements of the antenna system.

In the system based on two different carrier frequencies, one EM wave having one differential carrier frequency and having an E-field vector rotating about the propagation axis is transmitted; another EM wave having the other differential carrier frequency and having an E-field vector rotating about the propagation axis in the opposite direction is transmitted. These waves superpose to produce a resultant wave with a new carrier frequency: waves having the either of the two different carrier frequencies do not exist in the received resultant wave. Waves having the two differential carrier frequencies are eliminated in the resultant wave due to the superposition of the two transmitted waves each having their own carrier frequency and their own E-field vector rotating about the propagation axis in opposite directions.

In an embodiment of the present invention, the antenna system is of the coaxial helical type. The coaxial helical antenna elements of the alternative embodiment illustrated in FIG. 12 cause the waves having the two differential carrier frequencies to eliminate each other upon superposition. In this alternative embodiment these waves are generated directly by driving one helical antenna element with the upper differential carrier frequency and the other helical antenna element with the lower differential carrier frequency. Helical antenna element 240 radiates a wave with an E-field vector rotating about the propagation axis at a frequency equal to the lower differential carrier frequency. Helical antenna element 238 radiates a wave with an E-field vector rotating about the propagation axis in the opposite direction at a frequency equal to the upper differential carrier frequency.

Antenna elements 238 and 240 need not be exactly coaxial so long as the receiving antenna system is disposed in the far-field of antenna elements 238 and 240. Thus, they could be placed side-by-side in many communications systems. If the separation between transmitter and receiver is great, such as the distance between a satellite and ground station, antenna elements 238 and 240 could likely be separated by several meters without significantly degrading system performance. The optimal physical construction of the dual helical antenna system thus depends upon various antenna design factors in view of the intended use of the communications system.

Receiver 236 is structurally similar to transmitter 234. Receiver 236 includes a dual helical antenna system comprising two helical antenna elements 274 and 276 having opposite twists coaxially mounted on a supporting structure 277. A reflector 278 (shown in cross-section in FIG. 12 for clarity) is mounted at the proximal end of the antenna system. Receiver 236 further includes receiver electronics comprising a lower differential carrier frequency filter 280, an upper differential carrier frequency filter 282, a summing circuit 284, an amplitude modulation detector circuit 286, and two notch filter and impedance matching circuits 288 and 290. Lower differential carrier frequency filter 280 has a bandpass centered at the frequency of the lower differential carrier frequency, and upper differential carrier frequency filter 282 has a bandpass centered at the frequency of the upper differential carrier frequency. Notch filter and impedance matching circuits 288 and 290 can be identical to circuits 254 and 256. Circuit 288 has a 6 MHz notch centered at the frequency of the lower differential carrier frequency and thus passes only the upper differential signal. Similarly, circuit 290 has a 6 MHz notch centered at the frequency of the upper differential carrier frequency and thus passes only the lower differential signal. Amplitude modulation detector circuit 286 may be of conventional construction, and thus may include amplifiers, detectors, a local oscillator, automatic gain control and any other circuitry known in the art that is commonly included in amplitude modulation radio receivers. Amplitude modulation detector circuit 286 should be tuned to receive a signal at the new carrier frequency, i.e., the average of the upper and lower differential carrier frequencies.

Lower differential carrier frequency filter 280 is coupled to antenna element 274, and upper differential carrier frequency filter 282 is coupled to antenna element 276. The inputs of summing circuit 284 are coupled to the outputs of filters 280 and 282. Summing circuit 284 receives a lower differential signal 292 produced by filter 280 and an upper differential signal 294 produced by filter 282. The receiver electronics function in a manner that is essentially the inverse of the transmitter electronics. As described above with respect to transmitter 234, the sum of the upper and lower differential signals is the carrier; the upper and lower differential signals cancel each other. Amplitude modulation detector circuit 286 recovers a reproduced information signal 298 that corresponds to information signal 258.

Figure 14:
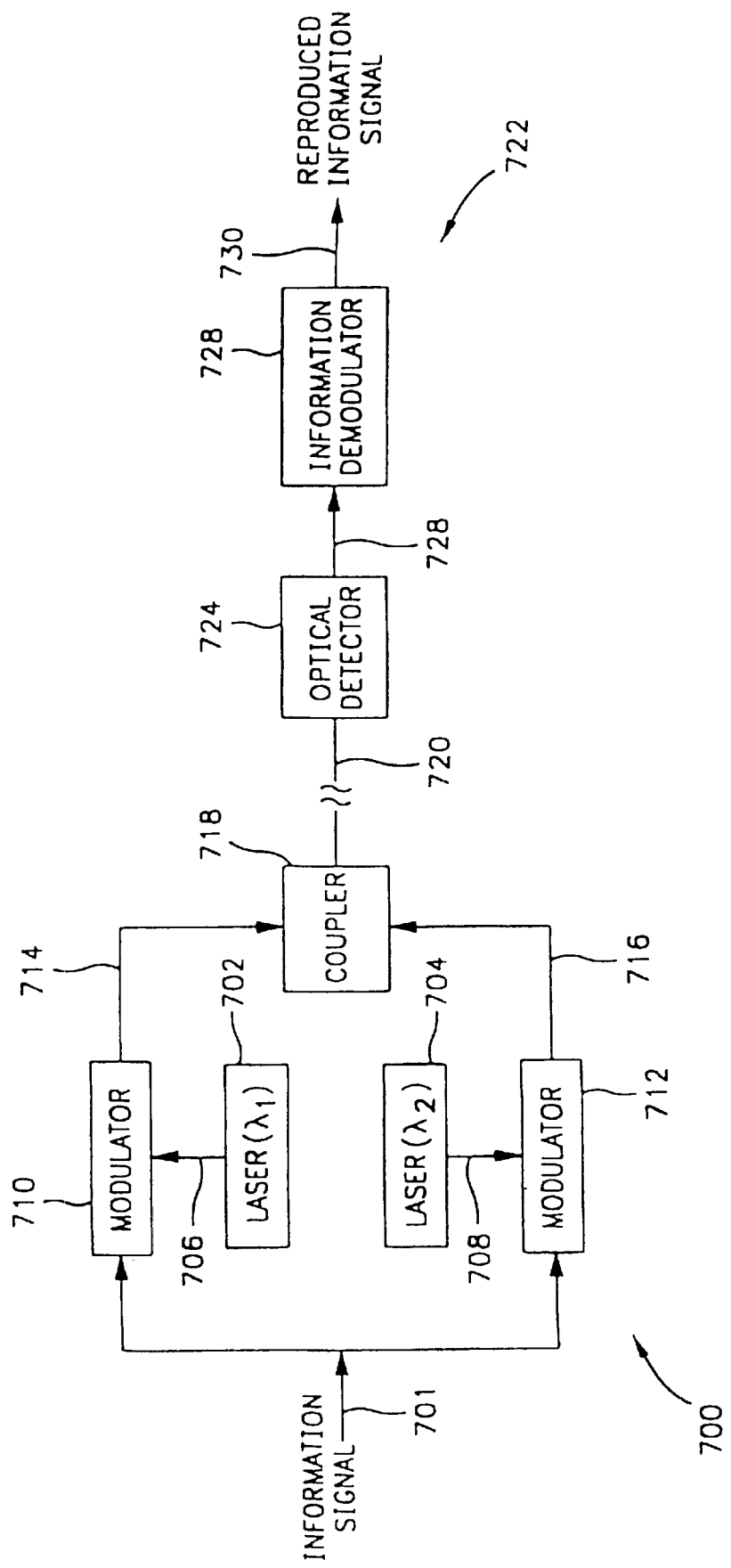
FIG. 14 is a block diagram of a communications system including an optical transmitter and receiver, according to an embodiment of the present invention.

FIG. 14 illustrates an optical communications system using two different carrier frequencies according to another embodiment of the present invention. In transmitter 700, lasers 702 and 704 produce optical waves 706 and 708, respectively, at two different carrier frequencies carrier, $f_1$, and $f_2$, respectively (or wavelengths $\lambda_1$ and $\lambda_2$). Modulators 710 and 712 modulate waves 706 and 708, respectively with information signal 701 to produce waves 714 and 716, respectively. Modulator 710 and/or 712 can modify the phase and amplitude of waves 706 and/or 708, respectively, so that the E-field vector for the waves rotate in opposite directions. For example, where optical waves 714 and 716 are linear polarized waves, modulator 710 and 712 each can include a quarter-wave plate to convert the linear polarized waves to circular polarized waves with opposite rotation directions. Alternatively, lasers 702 and 704 can be configured to produce waves 706 and 708, respectively, with an E-field vector rotating in opposite directions. In one embodiment of the present invention, wave 706 is circularly polarized in one direction and wave 708 is circularly polarized in the opposite direction. Coupler 718 combines waves 714 and 716 to produce a superposed wave which is sent over optical fiber 720.

Receiver 722 includes optical detector 724 which receives the superposed optical signal from optical fiber 720, and information demodulator 728. Optical detector 724 receives waves 734 and 736 to produce signal 728. Optical detector 724 is optimized to receive center wavelengths $\lambda_1$ and $\lambda_2$ and effectively acts as a spectral filter due to an optical detector's inherent spectral response. Information demodulator 728 receives signal 728 to produce signal 730 which is the reproduction of information signal 701.

The carrier wavelength detected by optical detector 724 is the average of carrier wavelengths $\lambda_1$ and $\lambda_2$. The superposed wave detected by optical detector 724 has an E-field vector rotating at an angular velocity equal to one-half of the difference of carrier wavelengths $\lambda_1$ and $\lambda_2$. For the case where wave 706 rotates clockwise and wave 708 rotates counterclockwise, if $\lambda_1$ is shorter than $\lambda_2$, the E-field vector of the superposed wave is clockwise; $\lambda_1$ is longer than $\lambda_2$, the E-field vector of the superposed wave is counterclockwise.

Lasers 702 and 704 can be selected to be optimized for propagation in optical fiber 334. For example, lasers 702 and 704 can be an aluminum gallium arsenide (AlGaSa) or an indium gallium arsenide (InGaAs) multi-layered, distributed feedback (DFB) lasers emitting in the wavelength range 1.3 to 1.55 $\mu$m. Optical detector 724 can be selected to be spectrally responsive to lasers 702 and 704. For example, optical detectors 738 and 740 can be back-biased gallium arsenide (GaAs) diode detectors.

Modulators 710 and 712 can be variously configured to modulate the phase and/or amplitude of the optical wave as is appropriate. For example, modulators 710 and 712 can be a lithium niobate (LiNbO3) electro-optic modulators, such as Pockel cells.

Multiple Channels Using Two Carrier Signals

Referring again to FIG. 12, the communications system may include multiple transmitters 234 and receivers 236 that communicate simultaneously (i.e., concurrently) via a corresponding multiplicity of channels. All of transmitters 234 and receivers 236 of such a system may operate simultaneously (i.e., concurrently), yet only one of receivers 236 communicates with each of transmitters 234. The rotation frequency provides the channel selectivity. Each transmitter 234 and receiver 236 operates at a selected rotation frequency. With respect to transmitter 234, lower differential carrier frequency source 242 is set to a frequency of the carrier frequency minus the selected rotation frequency, and upper differential carrier frequency source 244 is set to a frequency of the carrier frequency plus the selected rotation frequency. With respect to receiver 236, lower differential carrier frequency filter 280 is set to a frequency of the carrier frequency minus the selected rotation frequency, and upper differential carrier frequency filter 282 is set to a frequency of the carrier frequency plus the selected rotation frequency. The new carrier frequency of resultant transmitted wave 272 is the average of the upper and lower differential carrier frequencies.

In an embodiment in which helical antenna element 240 emits an EM wave having an E-field vector rotating about the propagation axis in a clockwise direction, and helical antenna element 238 emits an EM wave having an E-field vector rotating about the propagation axis in a counterclockwise direction, the E-field vector of wave 272 rotates about the propagation axis in a clockwise direction because upper differential carrier frequency source 244 produces a higher frequency than lower differential carrier frequency source 242. In an embodiment in which helical antenna element 240 emits an EM wave having an E-field vector rotating about the propagation axis in a clockwise direction, and helical antenna element 238 emits an EM wave having an E-field vector rotating about the propagation axis in a counterclockwise direction, the E-field vector of wave 272 rotates about the propagation axis in a counterclockwise direction because upper differential carrier frequency source 244 produces a higher frequency than lower differential carrier frequency source 242. Filters 280 and 282 may include varactors or other tunable circuitry to facilitate tuning receiver 236 to a selected channel. Although not shown for purposes of clarity, receiver 236 may further include a switch that an operator may use to swap the two signals coupled to antenna elements 276 and 274 with one another to facilitate reception of the transmitted signal regardless of whether its polarization is right-hand or left-hand.

Although the electronic circuit elements of the transmitters and receivers of the above-described embodiments can be directed toward analog electronics, their functions alternatively can be performed digitally using equivalent digital electronics.

In embodiments of the present invention using two differential carrier frequencies, channels should be allocated an appropriate bandwidth in the domain of the rotation frequency to transmit the information effectively. In other words, the rotation frequency of each channel (specified by the lower and upper differential carrier frequencies) for a given carrier frequency (i.e., the average of the lower and upper differential carrier frequencies) should be sufficiently offset from the rotation frequencies of adjacent channels having the same (or close to the same) carrier frequency so that the channels do not overlap. Each pair of nonlinear path frequency sources defining a different channel should be selected to separate the corresponding signals in the rotation frequency domain from one another to avoid overlapping.

In general, the EM wave (e.g., EM wave 272 in FIG. 12 or EM wave 614 in FIG. 16) can have its E-field vector rotating about the propagation axis at a rotation frequency less than the new carrier frequency (i.e., the average of the lower and upper differential carrier frequencies) and greater than zero. More specifically, however, the rotation frequency should be selected to be sufficiently less than the new carrier frequency and greater than zero to enable detection by the receiver without at least a portion of the information being unrecoverable. A portion of the information may otherwise be unrecoverable when the rotation frequency is selected such that the frequencies of certain information frequency components exceed the new carrier frequency or fall below zero.

When certain frequency components of the information exceed, for example, the new carrier frequency, those frequency components of the information will be detected by the receiver as inverted at rotation frequencies less than the new carrier frequency; these inverted rotation frequency components will cancel the non-inverted rotation frequency components thereby causing a portion of the information to be unrecoverable. For example, a rotation frequency component exceeding the new carrier frequency by 10 MHz will be inverted and canceled with the rotation frequency component at the new carrier frequency minus 10 MHz by the receiver.

The frequency components of the information correspond to the bandwidth of the information and the manner in which the information is carried on the EM wave. The information can be carried on the EM wave (e.g., EM wave 272 in FIG. 12 or EM wave 614 in FIG. 16) in either the frequency domain and/or the rotation domain. In other words, the information can be carried upon the EM wave by modulating the new carrier frequency (e.g., using amplitude modulation, frequency modulation or phase modulation) and/or by modulating the rotation frequency (e.g, using frequency modulation or phase modulation).

For example, where the information is only amplitude modulated on to the new carrier frequency, the frequency bandwidth of the EM wave approximately equals the bandwidth of the information. In this case, the rotation frequency of the EM wave should be less than the new carrier frequency by one-half of the information bandwidth and greater than zero by one-half of the information bandwidth. For example, where the information bandwidth is 6 MHz, the lowest possible rotation frequency should be greater than one half of the bandwidth to provide sufficient room above zero for the channel (e.g., 3 MHz for a 6 MHz bandwidth information signal), and the highest possible rotation frequency should be at least one half of the bandwidth below the new carrier frequency (e.g., 3 MHz for a 6 MHz bandwidth information signal).

CONCLUSION

It should be noted that any suitable transmitter and receiver that operate in accordance with the rotation principle of the present invention may communicate with each other. Transmitter 10 is illustrated in FIG. 1 paired with receiver 12 only for illustrative purposes. Similarly, transmitter 234 is illustrated in FIG. 12 paired with receiver 236 only for illustrative purposes. Transmitter 10 illustrated in FIG. 1 may communicate with receiver 236 illustrated in FIG. 12. Similarly, transmitter 234 illustrated in FIG. 12 may communicate with receiver 12 illustrated in FIG. 1. Although the embodiment illustrated in FIG. 1 can use a dipole antenna system (or a monopole antenna system), and the embodiment illustrated in FIG. 12 can use a coaxial helical antenna system, in both embodiments an information channel is defined by a wave having an E-field vector rotating about the propagation axis at a selected frequency.

Still other embodiments of the present invention may occur to those skilled in the art in view of the various other types of antenna systems known in the art and the teachings in this specification. For example, because it is known that a dipole antenna (or a monopole antenna) may be emulated by driving two coaxially disposed helical antennas having opposite twists with the same signal, the dipole antenna system of the embodiment of the present invention illustrated in FIG. 1 could be replaced with an antenna system comprising four helical antennas.

In addition, although in the illustrated embodiments the communicated information is carried upon the wave in the frequency domain, in accordance with the present invention the information may be carried upon the wave in the polarization rotation domain. In other words, a wave can have an essentially fixed or constant carrier frequency and an E-field vector rotating about the axis of propagation at a frequency modulated in accordance with the information. For example, the rotating E-field vector can be phase modulated with information or frequency modulated with information.

Additionally, the information can be carried upon the wave in the polarization rotation domain while the information is also carried upon the wave in the frequency domain. For example, information can be amplitude modulated in the frequency domain while frequency modulated in the polarization rotation domain. Six combinations are possible: amplitude modulation, frequency modulation or phase modulation in the frequency domain combined with frequency modulation or phase modulation in the polarization rotation domain.

The present invention provides an additional communication domain that is distinct from frequency, amplitude and phase. It may be used in conjunction with conventional frequency-division channel multiplexing and any other multiplexing systems known in the art to define a greater number of communication channels than in conventional communications systems. Furthermore, because noise is distributed over all channels of the system, much less noise is present in each channel than in conventional systems. The present invention thus facilitates the design of very low power communications systems.

What is claimed is:

1. A method for transmitting information using an electromagnetic wave, comprising:
   simultaneously transmitting a first information channel and a second information channel multiplexed together, each information channel being associated with a combination of a carrier frequency and a rotation frequency, the first information channel combination being different from the second information channel combination, the rotation frequency of each combination being greater than zero and less than the carrier frequency of that combination.

2. The method of claim 1, wherein the rotation frequency associated with the first information channel differs from the rotation frequency associated with the second information channel based on a bandwidth of the first information channel and a bandwidth of the second information channel.

3. The method of claim 1, wherein the rotation frequency associated with the first information channel is less than the carrier frequency associated with the first information channel by at least one-half of a bandwidth associated with the first information channel and is greater than zero by at least one-half of the bandwidth associated with the first information channel.

4. The method of claim 1, wherein the two information channels are transmitted using at least three antenna elements arranged angularly around the propagation axis in a non-perpendicular manner and within a plane transverse to the propagation axis.

5. The method of claim 1, wherein:
   the two information channels are transmitted using at least three antenna elements arranged angularly around the propagation axis and within a plane transverse to the propagation axis; and the antenna elements receiving for each information channel a rotationally modulated signal shifted an amount corresponding to the angular arrangement of the antenna elements.

6. A method for receiving information using an electromagnetic wave, comprising:

simultaneously receiving a first information channel and a second information channel multiplexed together, each information channel being associated with a combination of a carrier frequency and a rotation frequency, the first information channel combination being different from the second information channel combination, the rotation frequency of each combination being greater than zero and less than the carrier frequency of that combination.

7. The method of claim 6, wherein the rotation frequency associated with the first information channel differs from the rotation frequency associated with the second information channel based on a bandwidth of the first information channel and a bandwidth of the second information channel.

8. The method of claim 6, wherein the rotation frequency associated with the first information channel is less than the carrier frequency associated with the first information channel by at least one-half of a bandwidth associated with the first information channel and is greater than zero by at least one-half of the bandwidth associated with the first information channel.

9. The method of claim 6, wherein the two information channels are received using at least three antenna elements arranged angularly around the propagation axis in a non-perpendicular manner and within a plane transverse to the propagation axis.

10. The method of claim 6, wherein:

the two information channels are received using at least three antenna elements arranged angularly around the propagation axis in a non-perpendicular manner and within a plane transverse to the propagation axis; and a rotation demodulator for each information channel shifting each rotation signal from a plurality of rotation signals an amount corresponding to the angular arrangement of the antenna elements.

11. A method for transmitting and receiving information using an electromagnetic wave, comprising:

simultaneously transmitting a first information channel and a second information channel multiplexed together, each information channel being associated with a combination of a carrier frequency and a rotation frequency, the first information channel combination being different from the second information channel combination, the rotation frequency of each combination being greater than zero and less than the carrier frequency of that combination; and simultaneously receiving the first information channel and the second information channel.

12. The method of claim 11, wherein the rotation frequency associated with the first information channel differs from the rotation frequency associated with the second information channel based on a bandwidth of the first information channel and a bandwidth of the second information channel.

13. The method of claim 11, wherein the rotation frequency associated with the first information channel is less than the carrier frequency associated with the first information channel by at least one-half of a bandwidth associated with the first information channel and is greater than zero by at least one-half of the bandwidth associated with the first information channel.

14. The method of claim 11, wherein the two information channels are transmitted and received using at least three antenna elements arranged angularly around the propagation axis in a non-perpendicular manner and within a plane transverse to the propagation axis.

15. The method of claim 11, wherein:

the two information channels are transmitted and received using at least three antenna elements arranged angularly around the propagation axis in a non-perpendicular manner and within a plane transverse to the propagation axis;

the antenna elements receiving for each information channel a rotationally modulated signal shifted an amount corresponding to the angular arrangement of the antenna elements; and a rotation demodulator for each information channel shifting each rotation signal from a plurality of rotation signals an amount corresponding to the angular arrangement of the antenna elements.

* * * * *